(12) United States Patent
Berner et al.

(10) Patent No.: US 11,533,108 B2
(45) Date of Patent: Dec. 20, 2022

(54) SIGNAL RETRANSMISSION SYSTEM AND METHOD

(71) Applicant: pureLiFi Limited, Edinburgh (GB)

(72) Inventors: Stephan Berner, Edinburgh (GB); Nikola Serafimovski, Edinburgh (GB); Mostafa Zaman Afgani, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 0 days.

(21) Appl. No.: 17/283,449

(22) PCT Filed: Oct. 11, 2019

(86) PCT No.: PCT/GB2019/052900
§ 371 (c)(1),
(2) Date: Apr. 7, 2021

(87) PCT Pub. No.: WO2020/074920
PCT Pub. Date: Apr. 16, 2020

(65) Prior Publication Data
US 2021/0344419 A1 Nov. 4, 2021

(30) Foreign Application Priority Data
Oct. 11, 2018 (GB) ..................... 1816598

(51) Int. Cl.
*H04B 10/114* (2013.01)
*H04B 10/40* (2013.01)
*H04L 1/08* (2006.01)
*H04L 5/16* (2006.01)

(52) U.S. Cl.
CPC .......... *H04B 10/114* (2013.01); *H04B 10/40* (2013.01); *H04L 1/08* (2013.01); *H04L 5/16* (2013.01)

(58) Field of Classification Search
CPC ......... H04B 10/114; H04B 10/40; H04L 1/08; H04L 5/16
(Continued)

(56) References Cited

U.S. PATENT DOCUMENTS 5,917,629 A * 6/1999 Hortensius ................ H04L 1/14
398/118
6,539,028 B1 * 3/2003 Soh ................... H04W 74/0825
370/445
(Continued)

FOREIGN PATENT DOCUMENTS

EP 483548 5/1992
JP H0340613 A 2/1991
(Continued)

OTHER PUBLICATIONS

International Preliminary Report on Patentability issued in App. No. PCT/GB2019/052900 dated Apr. 22, 2021.
(Continued)

*Primary Examiner* — Dalzid E Singh
(74) *Attorney, Agent, or Firm* — Snell & Wilmer L.L.P.

(57) ABSTRACT

An optical wireless communication system comprises: a first device comprising a transceiver apparatus; and a plurality of further devices each comprising respective further transceiver apparatus, wherein the first device is configured to communicate via at least one optical channel with the plurality of further devices, and the transceiver apparatus of the first device comprising: a receiver for receiving light (optionally of a first wavelength or range of wavelengths) representing optical wireless communication signals transmitted by the further devices, the receiver comprising at least one photodetector; receiver-side processing circuitry for processing optical wireless communication signals
(Continued)

received by the receiver to extract data represented by the received optical wireless communication signals; a transmitter for transmitting further light (optionally of a second wavelength or range of wavelengths)s representing optical wireless communication signals; transmitter-side processing circuitry for producing optical wireless communication signals for transmission by the transmitter; a multiplexer arrangement that is arranged to receive optical wireless communication signals from a plurality of signal paths and to pass the signals to the transmitter for transmission; and a controller for controlling operation of the transceiver apparatus of the first device, wherein a first of the signal paths to the multiplexer arrangement is from the transmitter-side processing circuitry; a second of the signal paths to the multiplexer arrangement is from the receiver-side; and the controller controls operation of the transceiver apparatus so as to pass via the multiplexer arrangement to the transmitter for re-transmission at least part of an optical wireless communication signal received from one of the further devices by the receiver thereby to indicate to the other further devices of the plurality of further devices that an optical channel of the receiver is busy.

34 Claims, 10 Drawing Sheets

(58) Field of Classification Search
USPC .......................................................... 398/130
See application file for complete search history.

(56) References Cited

U.S. PATENT DOCUMENTS

2017/0207851 A1* 7/2017 Zeng .................... H04B 10/116
2019/0068281 A1* 2/2019 Jiang ...................... H04B 10/11

FOREIGN PATENT DOCUMENTS

JP              298414          10/1999
WO         2010076480           7/2010

OTHER PUBLICATIONS

GB Search Report issued in Application No. GB 1816598.5 dated Apr. 5, 2019.
"pureLiFi's Proposals for LB-OFDM PHY", IEEE 15-18-0168-00-0013, May 2018.
Xin Lin et al., "High-Speed Full-Duplex Multiaccess System for LED-Based Wireless Communications Using Visable Light," semanticscholar.org, pp. 1-3, Jan. 1, 2009.

* cited by examiner

SIGNAL RETRANSMISSION SYSTEM AND METHOD

CROSS-REFERENCE TO RELATED APPLICATIONS

This application is a national stage application of PCT/GB2019/052900, filed on Oct. 11, 2019, entitled "Signal Retransmission System and Method", which claims priority to GB Application No. 1816598.5, filed on Oct. 11, 2018, which are hereby incorporated by reference in their entirety for all purposes.

INTRODUCTION

The present invention relates to a wireless communication system and method, for example an optical wireless communication system and method.

BACKGROUND

It is known to provide wireless data communications by using light instead of radio frequencies to transmit and receive data wirelessly between devices. Data may be transmitted using light by modulating at least one property of the light, for example the intensity of the light. Methods that use light to transmit data wirelessly may be referred to as optical wireless communications (OWC) or light communications (LC). LiFi is one form of optical wireless communication.

In Optical Wireless Communication systems (for example, LiFi systems), usually a number of Access Points (APs) communicate with a number of Stations (STAs). Both the Access Points and the Stations may be full duplex devices, capable of transmitting and receiving at the same time.

Optical wireless communication (OWC), or light communication (LC), can offer advantages over conventional RF wireless communication such as Wi-Fi™, due to the characteristic of the optical channel. Optical signals usually do not penetrate, for example, walls, unlike RF signals, which can provide for increased security. Furthermore, the optical transmissions can be particularly directional in nature.

In some cases, it may be desirable to adapt protocols from Wi-Fi in OWC, such as packet-based protocols, for example IEEE™ 802.11™. This can assist in the integration of technologies such as LiFi and Wi-Fi. However, due to the different properties of the LiFi channel compared to Wi-Fi this is not straightforward.

For example, channel sensing and collision avoidance may present different issues for LC (e.g. LiFi) than for WiFi or other RF communication systems.

Channel sensing, sometimes referred to as carrier sensing in RF wireless communication, is a method of determining whether the shared medium (for example the channel) is in use or not. Prior to transmitting, a given node listens to a shared medium, for example a wireless channel or channels, to determine if there is traffic being sent by one or more other devices.

Various handshaking procedures, for example 2-way or 4-way handshaking procedures, channel sensing procedures and the use of back-off times have been developed in RF communications in order to reduce the probability of a collision. An example of a system that can provide collision avoidance in RF communications is IEEE 802.11 RTS/CTS exchange.

Collision avoidance in relation to channel sensing can refer to avoiding data packets from interfering with other packets at an intended receiver on a single channel network. These collisions may occur if two or more nodes send packets at the same time, or during the same time period, which may be referred to as a collision period (CP). Where there are likely to be hidden nodes (discussed below) or long packets, it is known to use collision-avoidance protocols. For example, a node/STA can send request-to-send (RTS) packet to the receiver, for example an AP. The AP responds with a clear-to-send (CTS) if it correctly receives the RTS. The STA transmits a data packet only after receiving a CTS successfully. Receiver-initiated collision-avoidance protocols have also been proposed in which the receiver initiates the handshake in contrast to a transmitter-initiated handshake.

The hidden node problem can be a consequence of lack of effective channel sensing. Due to the directional characteristics of both optical transmitters (e.g. LEDs) and receivers (e.g. photodetectors), the hidden node problem is considered a key issue in OWC as well as some RF-based technologies. Hidden nodes are nodes in a network whose transmissions are not detected by all other nodes, for example, two mobile stations (STAs). The hidden node problem can produce collisions due to concurrent transmissions, leading to performance degradation of the communications in the network.

FIG. 1 is a is a schematic illustration of a simple LiFi network having an access point (AP) 2 that is able to communicate via optical wireless communication with two different stations 4, 6. The stations 4, 6 use infra-red light for uplink transmission to the AP 2 in this example. Because of the different wavelengths used for uplink and downlink, because uplink transmission in the infrared band is very directional and because such transmission is directed toward the AP rather than towards the other station, neither station 4, 6 can determine if the other station 4, 6 is transmitting. Thus, the stations 4, 6 are not able directly to use channel sensing techniques to avoid collisions. As a result, station 4 is a hidden node with respect to station 6 and vice versa. This is in contrast to RF or Wi-Fi communications where transmissions may be omnidirectional and hidden node problems may thus not occur or may occur only in particular circumstances.

It has been suggested to use a busy signal to assist in collision avoidance, as described in WO 2017/037437, the contents of which are hereby incorporated by reference.

Whilst the use of a medium busy signal can be advantageous, there may in some cases be a long latency between a station starting to send a packet and an AP sending a medium busy signal. If it is desired to encode the packet duration in the medium busy signal, the latency can be even longer because the AP has to decode the header of the uplink packet before it can transmit the busy signal. This may, in some circumstances, increase the probability of collisions. Furthermore, downlink efficiency in some cases can be reduced due to the high latency, because the AP has to send the busy signal first before, if desired, sending some downlink data.

It is an aim of the present invention to provide an improved or at least alternative OWC communication system and method.

SUMMARY

In a first, independent aspect there is provided an optical wireless communication system comprising:
a first device comprising a transceiver apparatus; and a plurality of further devices each comprising respective further transceiver apparatus.

The first device may be configured to communicate via at least one optical channel with the plurality of further devices. The transceiver apparatus of the first device may comprise:

- a receiver for receiving light (optionally of a first wavelength or range of wavelengths) representing optical wireless communication signals transmitted, for example, by the further devices. The receiver may comprise at least one photodetector;

The transceiver apparatus of the first device may comprise receiver-side processing circuitry for processing optical wireless communication signals received by the receiver to extract data represented by the received optical wireless communication signals.

The transceiver apparatus of the first device may comprise a transmitter for transmitting further light (optionally of a second wavelength or range of wavelengths) representing optical wireless communication signals.

The transceiver apparatus of the first device may comprise transmitter-side processing circuitry for producing optical wireless communication signals for transmission by the transmitter.

The transceiver apparatus of the first device may comprise a multiplexer arrangement that is arranged to receive optical wireless communication signals from a plurality of signal paths and to pass the signals to the transmitter for transmission.

The transceiver apparatus of the first device may comprise a controller for controlling operation of the transceiver apparatus of the first device.

A first of the signal paths to the multiplexer arrangement may be from the transmitter-side processing circuitry;

A second of the signal paths to the multiplexer arrangement may be from the receiver-side.

The controller may control operation of the transceiver apparatus so as to pass via the multiplexer arrangement to the transmitter for re-transmission at least part of an optical wireless communication signal received from one of the further devices by the receiver, for example thereby to indicate to the other further devices of the plurality of further devices that an optical channel of the receiver is busy.

An optical wireless communication signal may be in the form of, or represented by, an electrical signal. The received light and the transmitted light may comprise light modulated to carry or represent corresponding optical wireless communication signals.

The first device may comprise an access point (AP) and the further devices may comprise stations (STAs).

The multiplexer arrangement may comprise a single multiplexer. The multiplexer arrangement may comprise a single device or a plurality of separate devices. The multiplexer arrangement may comprise a switch or a plurality of switches, for example controlled by the controller. Each switch may be connected to a respective signal path leading to the multiplexer arrangement. The switch(es) may connect the signals paths to a common output or outputs.

The transceiver of the first device may comprise at least one wavelength conversion component, for example arranged such that said at least part of the received optical wireless signal re-transmitted by the transmitter is re-transmitted at a different wavelength or range of wavelengths than the wavelength or range of wavelengths at which it was received by the receiver.

The wavelength conversion component may be configured to convert from infra-red to visible wavelength(s) or vice versa.

The passing to the transmitter for re-transmission at least part of the received optical wireless communication signal may comprise processing said at least part of the received optical wireless communication signal to produce a processed signal and/or a representation of said at least part of the received optical wireless communication signal, and the re-transmission may comprise transmitting by the transmitter said processed signal and/or representation.

The processed signal and/or representation may comprise a noise signal and/or an encoded or scrambled representation of said at least part of the received optical wireless communication signal.

The system may further comprise at least one of an encryption system, a scrambler or a noise generation device arranged to process said at least part of the received optical wireless communication signal.

The transceiver of the first device may be configured to process the received optical wireless communication signal such that said at least part of the received optical wireless signal is re-transmitted on a different channel than the channel on which it was received by the receiver of the first device.

The receiver-side processing circuitry may comprise a chain of receiver-side processing components that perform a sequence of operations on received optical wireless communication signals, and the second of the signal paths to the multiplexer arrangement may be from a branching point on the receiver-side before a subsequent at least one of said receiver-side components.

The receiver-side processing circuitry may be configured such that a received optical wireless communication signal is split at the branching point such that the received optical wireless communication signal is both sent along the second of the signal paths to the multiplexer arrangement, and sent to the subsequent at least one of said receiver-side components.

The branching point may comprise a splitter and/or a switching arrangement. The controller may be configured to control operation of the branching point, for example the splitter and/or a switching arrangement, for instance so as determine whether the optical wireless communication signal is sent to one, both or neither of the second of the signal paths to the multiplexer arrangement and the subsequent at least one of said receiver-side components.

The branching point may be arranged so that at least part of the optical wireless communication signal is at least partially decoded or otherwise processed, optionally by the receiver side processing circuitry, and optionally is simultaneously retransmitted by the transmitter of the first device.

The controller may be configured to control operation of at least one of the multiplexer arrangement, the splitting of the received optical wireless communication signal at the or a branching point, and/or the transmitter of the first device.

Said control may be in dependence on an outcome of said decoding or other processing of the received optical wireless communication signal.

Said decoding or other processing of the received optical wireless communication signal may comprise determining an identifier that identifies the device or group of devices from which the optical wireless signal was received. The controlling of at least one of the multiplexer, the splitting of the received optical wireless communication signal at the branching point, and/or the transmitter may be performed in dependence on said identifier.

The identifier may comprise a pseudonoise (PN) sequence, and/or the decoding or other processing may be performed without or before decoding a frame with which the identifier is associated.

The system may be configured to perform said retransmission in response to the determined identifier matching or being correlated to a stored identifier.

The system may be configured to transmit by the transmitter said processed signal and/or representation in response to the determined identifier matching a stored identifier.

The controller may be configured to perform at least one action in response to the outcome of the or an at least partial decoding or other processing of the received optical wireless communication signal, said at least one action comprising at least one of:
a) continuing to retransmit by the transmitter of the first device said received optical wireless communication signal;
b) cease retransmitting by the transmitter of the first device said received optical wireless communication signal;
c) transmit by the transmitter of the first device an optical wireless communication signal of the first device sent to the multiplexer arrangement via the first signal path from the transmitter-side processing circuitry.

The controller may be configured to control operation of the transceiver apparatus so as at least one of:
d) if said at least partial decoding or other processing of the received optical wireless communication signal indicates that the optical wireless communication signal is intended for the first device then at least one of: continue said decoding or other processing of the signal; cease the retransmitting by the transmitter of the first device said received optical wireless communication signal; begin transmission by the transmitter of the first device an optical wireless communication signal;
e) if said at least partial decoding or other processing of the received optical wireless communication signal from a further device of the plurality of further devices indicates that the optical wireless communication signal is intended for another of the further devices or an alternative further device then continue retransmission of the signal by the transmitter;
f) cease both said at least partial decoding or other processing of the received optical wireless communication signal and cease retransmission of the received optical wireless communication signal by the transmitter of the transceiver of the first device.

The controller may be configured to control operation of the transceiver apparatus of the first device so that if said at least partial decoding or other processing of the received optical wireless communication signal indicates that the optical wireless communication signal is intended for the first device, then cease retransmitting by the transmitter of the first device of said received optical wireless communication signal, transmit by the transmitter of the first device said optical wireless communication signal of the first device and if the duration of the optical wireless communication signal of the first device is less than the duration of the received optical wireless communication signal then resume retransmission of the received optical wireless communication signal after completion of transmission of the optical wireless communication signal of the first device.

The received optical wireless communication signal may comprise an uplink signal and at least one of the optical wireless communication signals produced by the transmitter-side processing circuitry may comprise a downlink signal, for example sent in response to the uplink signal.

The uplink signal and downlink signal may comprise or form part of an exchange of signals between a further device of the plurality of further devices and the first device, for example that establishes or forms part of a channel busy period during which an optical wireless communication channel from the first device is reserved for said further device and is excluded for use by other of the further devices.

The uplink signal and downlink signal may comprise or form part of a handshaking procedure.

The system may further comprise an envelope detector arranged to receive optical wireless communication signals from the transmitter-side processing circuitry. Operation of the multiplexer arrangement and/or the transmitter may be dependent on an output of the envelope detector.

The multiplexer arrangement and/or transmitter may be configured so as to switch between re-transmitting the received optical wireless communication signal and transmitting optical wireless communication signal(s) from the transmitter-side processing circuitry in dependence on an output of the envelope detector.

The envelope detector may be on said first of the signal paths to the multiplexer arrangement or may be on a further signal path to the multiplexer arrangement.

The second of the signal paths to the multiplexer arrangement may be arranged such that optical wireless communication signals received by the receiver of the first device are passed to the multiplexer arrangement in analogue form and/or without analogue to digital conversion.

The second signal path may be arranged so that in operation the received optical wireless communication signal is passed both to the receiver-side processing circuitry and to the multiplexer arrangement.

The second of the signal paths may include at least one optical component that is arranged to direct light representing the optical wireless communication signal from the receiver side along said signal path.

The system may further comprise a further receiver on said second signal path configured to convert said directed light to a corresponding electrical signal, optionally for providing to the multiplexer arrangement.

The system may further comprise at least one optical component that is configured to reflect or otherwise direct in a desired direction at least some of the received light representing optical wireless communication signals.

The at least one optical component may be configured to reflect or otherwise direct said at least some of the received light towards at least one, optionally each, of the further devices.

The at least one optical component may comprise a mirror, optionally a convex mirror.

The transceiver apparatus of the first device may be configured to re-transmit received optical wireless communication signals, in whole or part, only if the transmitter is not busy with transmission of optical wireless communication signals from the transmitter-side processing circuitry.

The optical wireless communication signal received at the receiver may comprise or represent at least one packet.

The transceiver of the first device may be configured to re-transmit using the transmitter said received optical wireless signal, in whole or part, substantially without modifying the content of the at least one packet.

The or each packet may comprise or represent at least one header that includes an address or identifier of the further device or other device from which the optical wireless was transmitted. The transceiver may be configured to re-transmit using the transmitter said at least one header including said address or identifier.

The packet or at least one of the packets may comprise at least a first portion and a second portion, and wherein at least one of g), h), i), j), k):

g) the first portion has a lower bit rate and the second portion has a higher bit rate;
h) the first portion has a higher bit rate and the second portion has a lower bit rate;
i) the first portion comprises a preamble and/or a packet header, and the second portion comprises at least part of a packet payload;
j) the first portion comprises information for identifying an intended recipient, optionally a MAC header;
k) the first portion comprises information representing a length of the packet.

The or each packet may have a packet structure in accordance with an OWC communication protocol, optionally a LiFi protocol.

The controller may be configured to control operation of the transceiver apparatus of the first device such that at least one of l) or m):

l) the transmitter of the first device retransmits a selected portion of the received wireless communication signal from the second signal path and in response to completion of the retransmission of said selected portion the transmitter of the first device transmits, or is made available to transmit, a signal from the first signal path;
m) the transmitter of the first device retransmits a selected portion of the received wireless communication signal from the second signal path for a period of time, and in response to completion of said period of time the transmitter of the first device transmits, or is made available to transmit, a signal from the first signal path.

The period of time may be less than or equal to 40 ms, optionally less than or equal to 20 ms, optionally between 0.01 ms and 40 ms, optionally between 0.01 ms and 40 ms.

The further devices may be configured such that the further device that transmits said optical wireless transmission signal that is retransmitted by the transmitter of the first device disables at least one component of its receiver or receiver side processing circuitry during at least part of the period during which the optical wireless transmission signal is retransmitted by the first device, for example to prevent reception of its own packet.

Said further device may re-enable at least one component of its receiver or receiver side processing circuitry to receive the or an optical wireless communication signal of the first device.

The plurality of further devices may be configured such that each of the other further devices of the plurality of further devices disables at least one component of its transmitter or transmitter side processing circuitry, or defers transmission, during at least part of the period during which the channel is busy with transmission between the first device and the further device of the plurality of further devices whose optical wireless communication signal is received by the first device.

Each of the plurality of further devices may be configured to determine whether to disable said at least one component or defer transmission based on a processing of at least a portion of an optical wireless communication signal received from the first device from the re-transmission process.

The processing may comprise an energy detection process and/or detection of noise, detection of a scrambled signal or at least partial decryption of an encrypted signal.

Each of the other of the plurality of further devices may determine a duration of the channel busy period based on a decoding of at least a portion, optionally a header, of the retransmitted optical wireless communication signal and/or said transmitted optical wireless communication signal of the first device.

Said decoding by the other of the plurality of further devices may comprise determining a length or type of packet.

Each of said other of the plurality of further devices may be configured to receive and decode at least a part of said retransmitted optical wireless communication signal and to selectively enable or disable at least one component of its transmitter or transmitter side processing circuitry, or defer or start transmissions, or continue or cease decoding or other processing, depending on the retransmitted optical wireless communication signal.

Said at least a part of the retransmitted optical wireless communication signal may comprise at least one of a preamble, a header, a lower bit rate section.

The first device may be configured to send poll signals to poll the plurality of further devices during a contention-free period. Upon receipt of the received optical wireless communication signal from said one of the further devices during the transmission of a poll signal during the contention-free period the transceiver apparatus of the first device may be configured to complete the transmission of the poll signal and then, if the duration of the optical wireless communication signal is longer than the poll signal, to retransmit a remaining part of said optical wireless communication signal.

Said one of the further devices that sent the retransmitted optical wireless communication signal may be configured to maintain its receiver in an enabled state during the receiving of a poll signal and to disable its receiver or at least one component of the receiver side processing circuitry during the retransmission of the remaining part of the optical wireless communication signal.

An interframe spacing for transmissions by the first device may be shorter than an interframe spacing for transmissions by the plurality of further devices.

The transceiver apparatus of the first device may comprise further circuitry between the multiplexer arrangement and the transmitter, optionally the further circuitry being configured to perform at least one process to prepare the optical wireless communication signals for transmission by the transmitter.

The system may include at least one amplifier on the second signal path.

The optical wireless communication system may comprise a full duplex communication system or a half duplex communication system.

The optical wireless communication system may operate according to an OWC communication protocol, optionally LiFi communication protocol.

The first wavelength or range of wavelengths may be different to the second wavelength or range of wavelengths.

The first wavelength or range of wavelengths comprises one of infrared, visible or ultraviolet wavelength(s), and the second wavelength or range of wavelengths comprises one of infrared, visible or ultraviolet wavelength(s).

The first device may be fixed at a stationary position. The first device may be portable. At least one, optionally each, of the further devices may be portable. At least one, optionally each, of the further devices may be fixed at a stationary position. The first device and the further devices may be STAs. The first device and at least one, optionally each, of the further devices may be APs.

In a further aspect, which may be provided independently, there is provided a transceiver apparatus of a first device configured to communicate via at least one optical channel with a plurality of further devices, the transceiver apparatus comprising:

a receiver for receiving light (optionally of a first wavelength or range of wavelengths) and representing optical wireless communication signals transmitted by the plurality of further devices, the receiver comprising at least one photodetector;

receiver-side processing circuitry for processing optical wireless communication signals received by the receiver to extract data represented by the received optical wireless communication signals;

a transmitter for transmitting light (optionally of a second wavelength or range of wavelengths) and representing optical wireless communication signals;

transmitter-side processing circuitry for producing optical wireless communication signals for transmission by the transmitter;

a multiplexer arrangement that is arranged to receive optical wireless communication signals from a plurality of signal paths and to pass the signals to the transmitter for transmission; and a controller for controlling operation of the AP transceiver apparatus, wherein a first of the signal paths to the multiplexer arrangement is from the transmitter-side processing circuitry;

a second of the signal paths to the multiplexer arrangement is from the receiver-side; and the controller controls operation of the transceiver apparatus so as to pass via the multiplexer arrangement to the transmitter for re-transmission at least part of an optical wireless communication signal received from one of the plurality of further devices by the receiver thereby to indicate to the other of the plurality of further devices that an optical channel of the receiver is busy.

In another aspect, which may be provided independently, there is provided a transceiver apparatus of a further device configured to communicate via at least one optical channel with a first device or at least one other further device, the transceiver apparatus of said further device comprising:

a receiver for receiving light (optionally of a first wavelength or range of wavelengths) and representing optical wireless communication signals, the receiver comprising at least one photodetector;

receiver-side processing circuitry for processing optical wireless communication signals received by the receiver to extract data represented by the received optical wireless communication signals;

a transmitter for transmitting light (optionally of a second wavelength or range of wavelengths) and representing optical wireless communication signals;

transmitter-side processing circuitry for producing optical wireless communication signals for transmission by the transmitter; and a controller for controlling operation of the transceiver apparatus, wherein the controller is configured to partially decode a received optical wireless communication signal and to determine whether to cease or continue decoding optical wireless communication signal and/or to transmit or hold off transmitting a further optical wireless communication signal depending on the outcome of the partial decoding.

In another aspect, which may be provided independently, there is provided a method of operating an optical wireless communication system, the system comprising:

a first device comprising a transceiver apparatus; and a plurality of further devices each comprising respective further transceiver apparatus, wherein the first device is configured to communicate via at least one optical channel with a plurality of further devices, and the transceiver apparatus of the first device comprising:

a receiver for receiving light (optionally of a first wavelength or range of wavelengths) representing optical wireless communication signals transmitted by the further devices, the receiver comprising at least one photodetector;

receiver-side processing circuitry for processing optical wireless communication signals received by the receiver to extract data represented by the received optical wireless communication signals;

a transmitter for transmitting light of a second wavelength or range of wavelengths and representing optical wireless communication signals; and transmitter-side processing circuitry for producing optical wireless communication signals for transmission by the transmitter, the method comprising receiving an optical wireless communication signal by the receiver of the first device, and determining whether to retransmit by the transmitter of the first device said optical wireless communication signal, in whole or part, or whether to transmit by the transmitter of the first device a further optical wireless communication signal, in dependence on data encoded by at least part of said optical wireless communication signal.

The method may comprise retransmitting by the transmitter of the first device a part of said optical wireless communication signal, wherein the determining comprises determining in dependence on said encoded data whether to retransmit a further part of said received optical wireless communication signal.

In a further aspect of the invention, which may be provided independently, there is provided an optical wireless communication system comprising:

a first device comprising a transceiver apparatus; and a plurality of further devices each comprising respective further transceiver apparatus, wherein the first device is configured to communicate via at least one optical channel with the plurality of further devices, and the transceiver apparatus of the first device comprises:

a receiver for receiving light (optionally of a first wavelength or range of wavelengths) representing optical wireless communication signals transmitted by the further devices, the receiver comprising at least one photodetector;

receiver-side processing circuitry for processing optical wireless communication signals received by the receiver to extract data represented by the received optical wireless communication signals;

a transmitter for transmitting further light (optionally of a second wavelength or range of wavelengths) representing optical wireless communication signals;

transmitter-side processing circuitry for producing optical wireless communication signals for transmission by the transmitter;

at least one optical component for reflecting or otherwise guiding at least some light received from at least one of the further devices towards at least one, optionally each, of the further devices;

a controller for controlling operation of the transceiver apparatus of the first device.

The reflection or other guiding of the light by the at least one optical component may be such as to indicate to said at least one, optionally each, of the further devices, that an optical channel of the receiver is busy.

The controller may be configured to monitor whether light representing optical wireless communication signals is received, and to control operation of the transceiver apparatus of the first device so that the transmitter transmits said further light in dependence on said monitoring, for example so as to transmit said further light in response to light representing optical wireless communication signals not being received.

Controllers of the further devices may be configured to determine whether to transmit or hold off transmitting a further optical wireless communication signal depending on whether or not light representing the optical wireless communication signal is received from (for example, by reflection from) said at least one optical element of the first device.

In a further aspect of the invention, which may be provided independently, there is provided a transceiver apparatus of a first device configured to communicate via at least one optical channel with a plurality of further devices, the transceiver apparatus comprising:

a receiver for receiving light (optionally of a first wavelength or range of wavelengths) representing optical wireless communication signals transmitted by the further devices, the receiver comprising at least one photodetector;

receiver-side processing circuitry for processing optical wireless communication signals received by the receiver to extract data represented by the received optical wireless communication signals;

a transmitter for transmitting further light (optionally of a second wavelength or range of wavelengths) representing optical wireless communication signals;

transmitter-side processing circuitry for producing optical wireless communication signals for transmission by the transmitter;

at least one optical component for reflecting or otherwise guiding at least some light received from at least one of the further devices towards at least one, optionally each, of the further devices;

a controller for controlling operation of the transceiver apparatus of the first device.

In another aspect, which may be provided independently, there is provided a method of operating an optical wireless communication system, the system comprising:

a first device comprising a transceiver apparatus; and
a plurality of further devices, the method comprising
receiving light representing an optical wireless communication signal by the transceiver apparatus of the first device,
reflecting or otherwise guiding at least some of the received light towards at least one, optionally each, of the further devices,
monitoring receipt of said light representing an optical wireless communication signal, and controlling operation of the transceiver apparatus of the first device to transmit further light representing a further optical wireless communication signal in dependence on said monitoring.

The reflection or other guiding of the light by the at least one optical component may be such as to indicate to said at least one, optionally each, of the further devices, that an optical channel of the receiver is busy.

The transmitting of said further light in dependence on said monitoring, may comprise transmitting said further light in response to receipt of the light by the transceiver halting or not occurring.

Features in one aspect may be provided as features in any other aspect, in any appropriate combination. For example, any one of system, apparatus, method or computer program product features may comprise any one other of system, apparatus, method or computer program product features.

BRIEF DESCRIPTION OF THE DRAWINGS

Various aspects of the invention will now be described by way of example only, and with reference to the accompanying drawings, of which.

DETAILED DESCRIPTION OF THE DRAWINGS

The term light herein may be used, for example, to refer to electromagnetic waves with wavelengths in a range 1 nm to 2500 nm, which includes ultraviolet, visible light and near-infrared wavelengths. Light may be used to refer to both visible light and non-visible light of any suitable wavelengths.

Embodiments described below relate to LiFi systems, but alternative embodiments may be suitable for implementation of any suitable OWC system or protocol.

Figure 1:
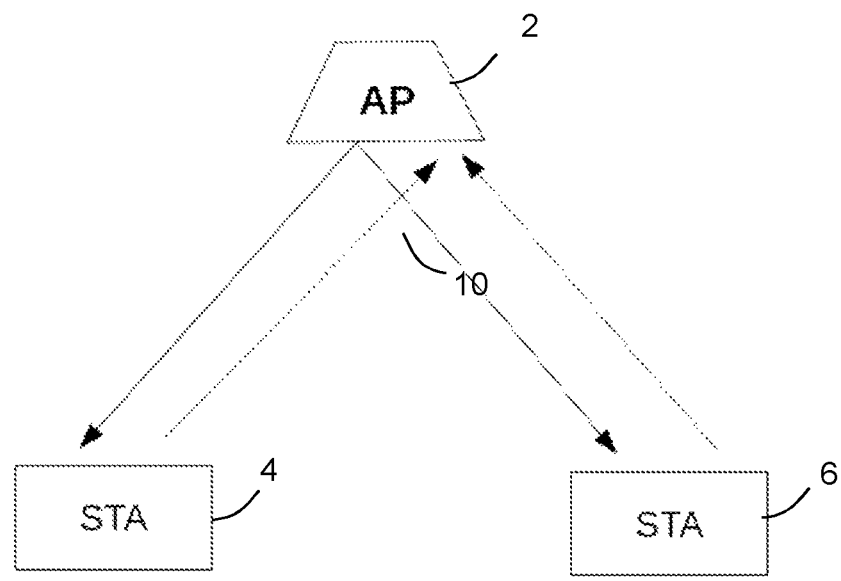
FIG. 1 is a is a schematic illustration of a simple LiFi network having an access point (AP) 2 that is able to communicate via optical wireless communication with two different stations 4, 6.
Figure 2:
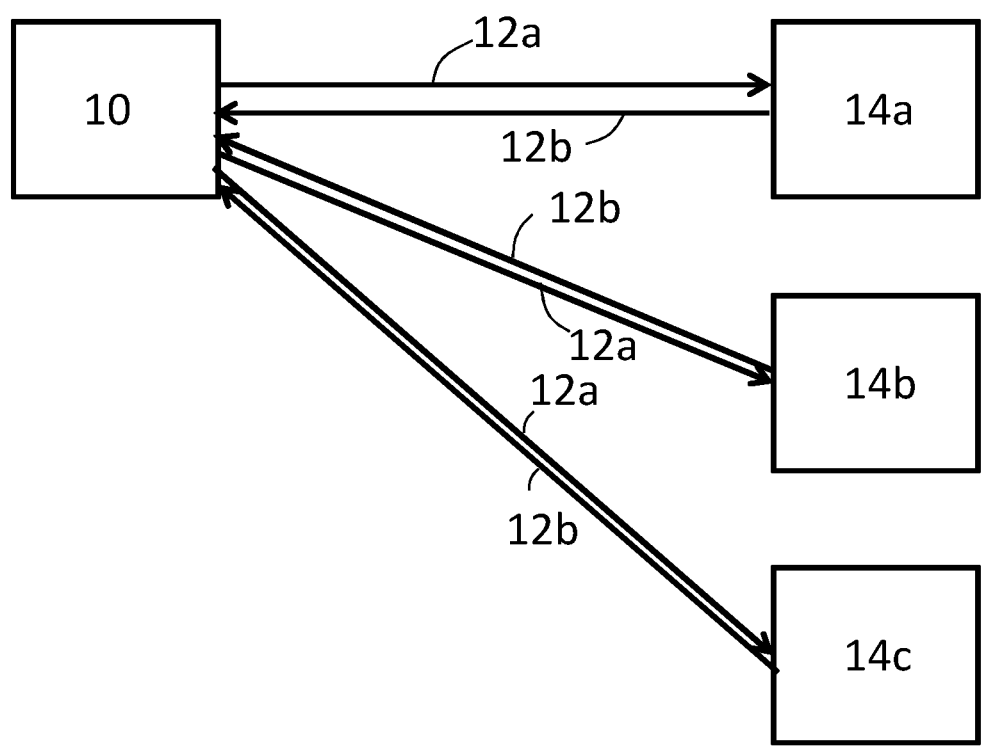
FIG. 2 is a block diagram illustrating principles of optical wireless communication (OWC) according to an embodiment.

FIG. 2 is a block diagram illustrating principles of optical wireless communication (OWC) according to embodiments. FIG. 2 shows an AP 10 that includes a transmitter/receiver apparatus, stations (STAs) 14a-14c that also include transmitter/receiver apparatus. The transmitter apparatus of the AP 10 is configured to send wireless optical signals in which information is encoded through optical communication channels 12a, 12b to and from receiver apparatus of the STAs 14a-14c. The optical communication channels 12a, 12b may be free-space communication channels. The optical communications channels 12a, 12b have characteristic optical wavelengths.

Two-way communication from the AP to one of the STAs 14a is illustrated schematically in FIG. 2. In the described embodiment and in many OWC protocols, for example LiFi protocols, simultaneous two-way communication, also referred to as full-duplex communication, is achievable. In the embodiment of FIG. 2 the AP 10 uses optical channels at different wavelengths for transmission and reception.

Free space communication channels include transmission of optical signals through air, space, vacuum, liquid such as water or similar.

Transmitters and/or receivers may be provided on different devices, including access points and stations as shown in FIG. 2. Access points may provide access to a further network, for example the internet. Stations may be portable or fixed. Without limitation, examples of stations include personal computers, desktops, laptops and smart devices, including mobile devices (for example, mobile phones, tablets or digital book readers). Portable stations may be powered by their own battery resource.

An access point may provide data transmission to and/or from a wired network or a Wi-Fi™ or other wireless network and/or other optical wireless communications network, optionally a LiFi network.

The transmitter apparatus of the AP 10 and the STAs 14a-14c includes a light emitting diode (LED), laser or other suitable light source, and an associated driving circuit to drive the LED or laser to produce the optical signal. The associated driving circuitry includes a digital to analogue convertor configured to provide a modulation signal at a frequency characteristic of an optical light communication signal. A further processor, provided as part of the transmitter apparatus or associated with the transmitter apparatus, modulates data onto a drive current and the driving circuitry provides the drive current to the LED or laser. The LED or laser then produces modulated light with a modulation that represents an outgoing optical wireless communication signal that carries the data.

The receiver apparatus of the AP 10 and the STAs 14a-14c includes a photodiode, or other suitable light detector, with associated circuitry to condition any received signal. The photodiode converts received light to an electronic signal which is then conditioned by the conditioning circuitry. Conditioning may include one or more filter steps; amplification of a weak electrical signal; equalisation of received signals and converting the analogue signals into digital signals using an analogue to digital convertor. The digital signal can then be provided to a further processor, provided as part of the receiver apparatus or associated with the receiver apparatus, to extract communication data.

Any suitable modulation scheme may be used. For example, orthogonal frequency division multiplexing (OFDM) modulation schemes are used in some embodiments, and the demodulation is from the OFDM modulation scheme. In further embodiments and without limitation, other modulation schemes may be used, for example on-off keying (OOK), phase shift keying (PSK), M-ary pulse amplitude modulation (M-PAM), M-ary quadrature amplitude modulation (M-QAM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), or discrete multi-tone (DMT). The light may be modulated at a modulation rate between 1 kHz and 1 PHz, for example at a modulation rate between 1 MHz and 100 GHz.

The modulation scheme may form part of an OWC communication protocol, such that the optical signal is produced according to the OWC communication protocol. The OWC communication protocol may be packet-based.

Figure 3:
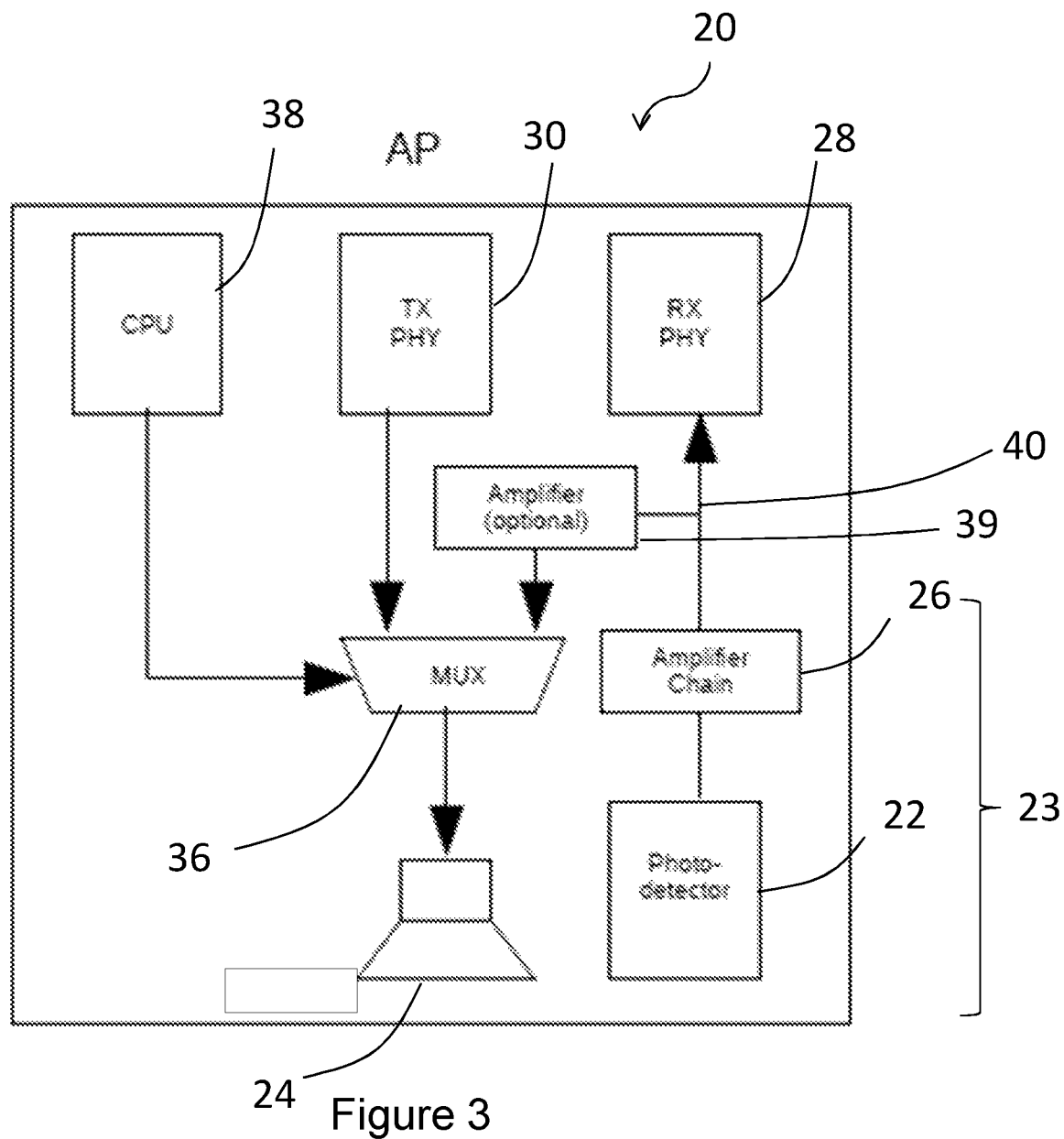
FIG. 3 is a schematic diagram of a transceiver apparatus of an AP according to an embodiment.

FIG. 3 is a schematic diagram of a transceiver apparatus 20 of the AP 10 in accordance with embodiments. For brevity, the transceiver apparatus 20 may also be referred to as transceiver 20.

The AP transceiver apparatus 20 includes an AP receiver 22 in the form of photodetector, and an AP transmitter 24, in the form of any suitable light emitting device or devices, for example one or more LEDs or lasers. As noted above, according to embodiments, the photodetector may comprise a photodiode, or any other suitable light detector and the AP transmitter may comprise a light emitting diode (LED), laser or any other suitable light source. The photodetector may, for example, be any one of: a PIN diode, an Avalanche Photo Diode (APD), a Silicon Photomultiplier (SiPM) or similar. Although referred to as a photodetector, the photodetector can be a single photodetector or a plurality of photodetectors. In some embodiments, the plurality of photodetectors are arranged in an array or a matrix.

The AP transceiver apparatus 20 includes AP receiver-side processing circuitry for processing optical wireless communication signals received by the AP receiver 22 to extract data represented by the received optical wireless communication signals.

The receiver-side processing circuitry comprises a chain of receiver-side processing components that perform a sequence of operations on received optical wireless communication signals.

The chain of receiver-side processing components in this embodiment comprises an amplifier stage 26 connected to the output of the photodetector 22. The combination of the amplifier stage 26 and the photodetector 22 may be referred to as the optical front end 23.

The amplifier stage 26 is connected to a further, physical layer, stage 28. In the present embodiment, the further stage 28 provides a baseband processing resource that is configured to receive amplified optical wireless communication signals from the amplifier stage 26 and extract data from the signals.

In the embodiment of FIG. 3, the further stage 28 comprises a high-speed analogue to digital converter (ADC) 32 and a demodulator 34. The ADC 32 and demodulator 34 are shown in FIG. 4, which is a more detailed schematic diagram of a part of the receiver-side processing chain.

Figure 4:
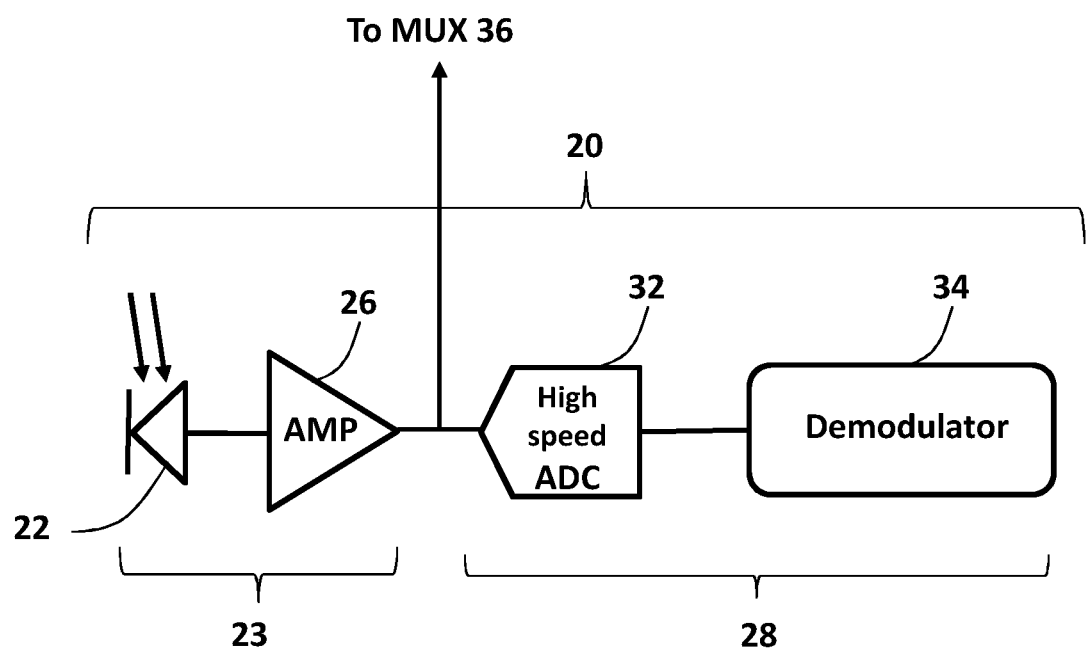
FIG. 4 is a schematic diagram of a part of a receiver-side processing chain of a transceiver apparatus of an AP according to an embodiment.

In the system of FIG. 4, the amplifier stage 26 comprises a transimpedance amplifier (not shown), also referred to as a TIA, and a variable gain amplifier (not shown), also referred to as a VGA. The TIA is configured to convert the current signal from the photodetector 22 into a voltage signal. The TIA may be incorporated or integrated into the photodetector 26 itself. The VGA is configured to condition the voltage signal from the TIA so that the voltage signal input to the ADC 32 is as close as possible to the maximum input range of the ADC 32. The VGA prevents clipping and minimizes the quantization noise introduced. In other embodiments, any suitable amplifier or combination of amplifiers may be used in the amplifier stage 26.

The ADC 32 converts the input analogue voltage to a digital signal. The digital signal comprises digital samples with a fixed or variable sample rate and fixed or variable resolution. The ADC 32 is used to convert signals which may comprise both lower-speed and higher-speed portions (for example, a given packet may comprise both lower-speed and higher-speed portions). The ADC 32 is therefore chosen to have a high enough speed to accommodate the highest expected data rates. In the example of FIG. 4, the ADC 32 has a frequency between 500 MHz and 2 GHz. The ADC 32 has a sample rate between 500 and 2,000 MSPS (megasamples per second). Any other suitable ADC or combination of ADCs may be used in alternative embodiments. Higher speed portions may be parts of the packet that have a higher bit rate, e.g. bit per second (bps) value, than other parts of the packet, which may be referred to as lower speed portions. Higher speed packets or portions may comprise packets or portions that represent an amount of data over a shorter time duration than the same amount of data would be represented by lower speed packets or portions.

In the example shown in FIG. 4, the ADC 32 has 12 bit resolution.

The samples output by the ADC 32 are processed by the baseband demodulator 34 to demodulate and/or decode signals to extract data. For example, the data may comprise a plurality of data packets, each comprising a respective preamble, header and payload.

Figure 5:
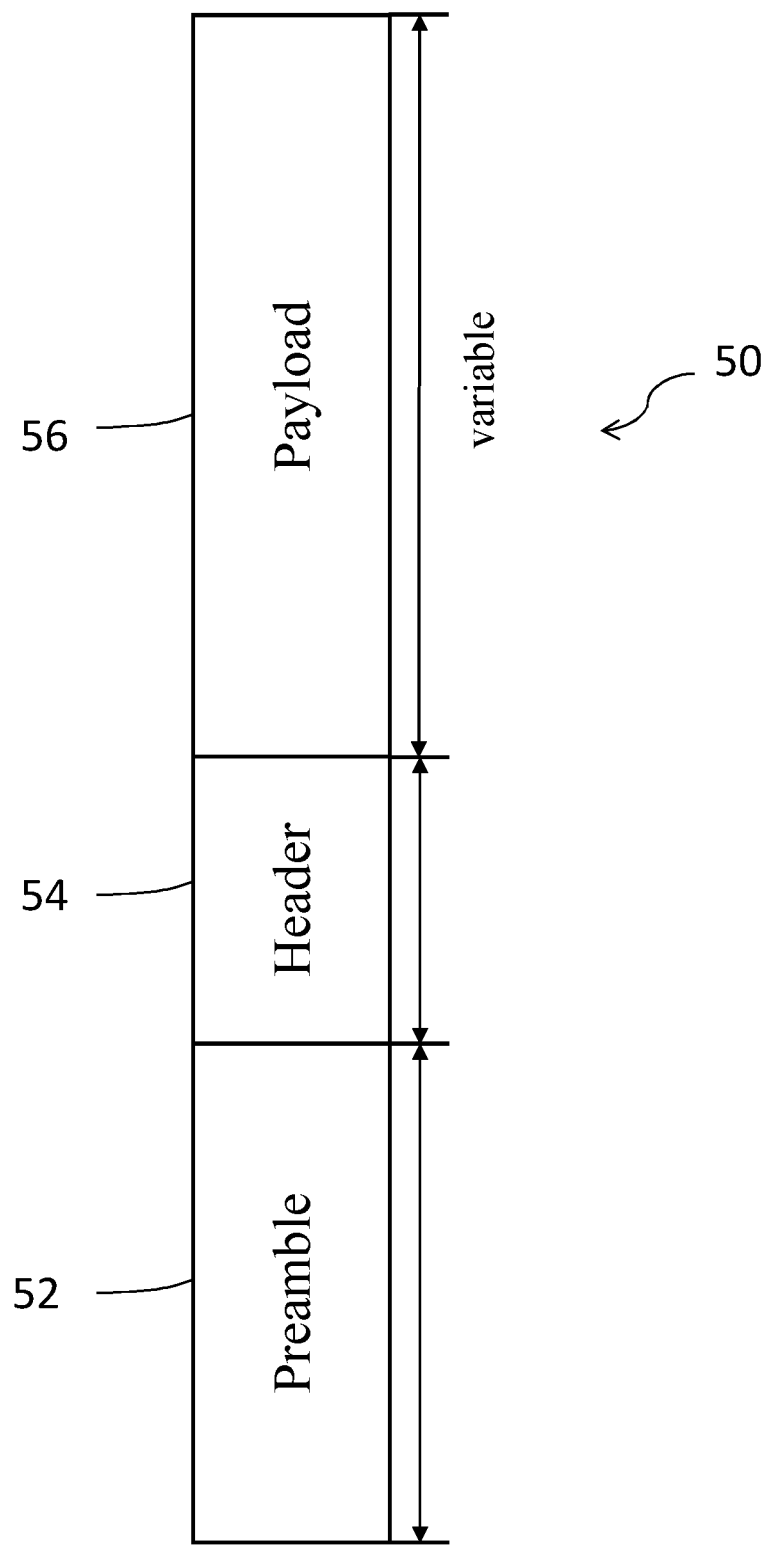
FIG. 5 is a schematic illustration of a packet used in an embodiment.

Any suitable signal format can be used in accordance with a suitable OWC protocol. In the embodiment of FIG. 3, OWC communications signals represent packets and an example of the structure of a packet 50 used in the embodiment of FIG. 3 is shown schematically in FIG. 5.

The packet 50 comprises a preamble 52, a header 54 and a payload 56.

In the embodiment of FIG. 3, the preamble 52 comprises a pseudonoise (PN) sequence that can be decoded at the receiver to determine, for example, whether each of the subsequent header and payload comprise higher speed (e.g. higher data rate) or lower speed (e.g. lower data rate) data, which can then be used by subsequent component(s) in the receiver chain. In the embodiment, different packets or different parts of the same packet (e.g. preamble, header, payload) may be encoded at different data rates.

The header 54 may contains all information necessary for demodulating the subsequent payload. In the embodiment of FIG. 3 the header is encoded in ½ FEC rate BPSK modulation using DCO-OFDM, but any other suitable encoding scheme may be used. The header 54 may include, for example, address information indicating the device for which the packet is intended, for example the AP 10 or one or more of the STAs 14a-14c.

The payload 56 is transmitted at any one of the data rates that may be supported by the system.

It will be understood that whilst components of the receiver-side processing circuitry are shown schematically in FIGS. 3 and 4 any other suitable components or combinations of components may be provided in alternative embodiments.

Turning to the transmitter side, the AP transceiver apparatus 20 of FIG. 3 includes AP transmitter-side processing circuitry 30 for producing optical wireless communication signals for transmission by the AP transmitter 24.

The AP transmitter-side processing circuitry 30 comprises circuitry to control the light source to produce light that is modulated to represent a desired optical wireless communication signal. The circuitry may include a digital to analogue convertor (not shown) configured to provide a modulation signal at a frequency range characteristic of an optical wireless communication signal. A processing resource, for example a suitably programmed processor, provided as part of the transmitter-side processing circuitry 30 or associated with the transmitter-side processing circuitry, provides optical wireless communication signals that represent data and that are used to modulate a drive current provided to the light source of the transmitter 24. The light source then produces an outgoing light signal that carries the optical wireless communication signal. The light source can include various power circuitry that powers operation of the light source of the transmitter 24. The modulation of the drive current to represent the desired optical wireless communication signal can be performed using any known OWC techniques.

Any suitable AP transmitter-side processing circuitry 30 may be used in embodiments, for example any transmitter-side processing circuitry 30 for providing suitably modulated signals in accordance with a Li-Fi protocol or other OWC communication protocol.

It is a feature of the embodiment of FIG. 3 that a multiplexer 36 is provided between the AP transmitter-side processing circuitry 30 and the AP transmitter 24 in the form of the LED or other light source. A plurality of signal paths lead to the multiplexer 36, with a first of the signal paths being from the AP transmitter-side processing circuitry 30 to the multiplexer 36 and a second of the signal paths being from a branching point 40 on the receiver side to the multiplexer 36, as shown schematically in FIG. 3. In some embodiments, one or more amplifiers 39 are provided on the second signal path between the branching point 40 and the multiplexer 36.

Any suitable multiplexer arrangement may be provided in alternative embodiments, and may for example be in the form of a single device or a plurality of devices. In some embodiments the multiplexer arrangement may comprise a switch or a plurality of switches.

The AP transceiver apparatus also includes a controller 38, shown in FIG. 3 as being in the form of a suitably programmed CPU. The controller 38 can have any other suitable form in other embodiments, for example software, hardware or a combination of software and hardware. In various embodiments, the controller 38 may be implemented as a single component, or a plurality of components at a single location, or a plurality of components distributed across a plurality of locations, for example including in the transmitter and/or receiver.

The controller 38 in the embodiment of FIG. 3 is operable to control whether signals from the first signal path (e.g. AP optical wireless communication signals from the transmitter-side processing circuitry) and/or signals from the second signal path (e.g. optical wireless communication signals received at the AP receiver 22) are sent to the transmitter 24 for transmission or re-transmission by the AP. The controller 38 can also prevent signals from both the first and second signal paths being sent to the transmitter in some circumstances.

In various embodiments, the controller 38 is configured to control operation of the multiplexer directly and/or to control operation of any other components of the AP transceiver apparatus 20 so as to control which signals are sent to the transmitter 24 for transmission or retransmission.

In some embodiments, the controller 38 is also operable to control whether the optical wireless communication signals are sent to other components of the AP transceiver and to control encoding, decoding or other processing of the optical wireless communication signals, in whole or part, either on the receiver or transmitter side, as well, optionally, as the timing of such processes.

In the embodiment of FIG. 3, the branching point 40 is shown as a simple split in the signal path between the amplifier stage 26 and the further stage 28 that provides a baseband signal processing resource for performing analogue to digital conversion and extraction of data. In some embodiments the branching point does provide such a simple split, so that all received optical wireless communication signals are sent both to the further stage 28 of the receiver-side processing chain and to the multiplexer 36. However, in some embodiments, the branching point 40 comprises or is associated with a splitter and/or a switching arrangement that, under control of the controller 38 is operable to determine whether the received optical wireless communication signal is sent to either, both or neither of the multiplexer 36 and further stage 28 of the receiver-side processing chain. The controller 38 is shown schematically in FIG. 3 as being linked only to the multiplexer 36 for clarity, but it will be understood that the controller 38 may be linked directly or indirectly or otherwise in communication with and/or controlling any of the components of the AP, according to embodiments.

It is a feature of embodiments that by providing a signal path back from the receiver-side to transmitter 24, optical wireless communication signals received from one of the STAs 14a by the receiver 22 can be retransmitted by the transmitter of the AP 10 to the other STAs 14b, 14c thereby providing a rapid and effective technique for indicating to the other STAs 14b, 14c, that an optical channel of the STA receiver is busy with communication with the STA 14a, or a rapid and effective technique for relaying received signals to other STAs.

In the embodiment of FIG. 3 the branching point is before the ADC 32 in the receiver side processing chain and so the received optical wireless communication signal is still in analogue form when it is passed to the transmitter 24 via the multiplexer 36. Passing the received optical wireless communication signal to the transmitter 24 for retransmission in analogue form without A to D conversion can provide for particularly rapid and efficient use of received optical wireless communication signals as busy signals, or for particularly rapid and efficient relaying of the optical wireless communication signals, with minimum latency.

In alternative embodiments, the branching point is after the ADC 32 and the received optical wireless communication signal is in digital form when it is passed to the transmitter side for processing and passing to the transmitter for retransmission. Digital to analogue conversion and any other processes to produce modulation of the transmitter current are then performed on the transmitter side in such embodiments. An example of such an embodiment is illustrated schematically in FIG. 6.

Depending on the OWC communication protocol that is being used, the AP receiver 22 is usually sensitive to light of wavelengths that are different to those of the light that is transmitted by the transmitter 24, particularly if the system provides full duplex communication. For example, in the embodiment of FIG. 3, the photodetector of the AP receiver 22 is sensitive to infra-red light and the transmitter 24 transmits visible light. In alternative embodiments, any suitable wavelengths of light may be used for uplink or downlink, for example infra-red light of different wavelengths may be used for uplink and downlink in some embodiments.

The photodetector of the AP receiver 22 outputs a signal that is representative of the amplitude of the light at the photodetector's operating wavelength or range of wavelengths (in this case infra-red wavelength(s)). IR light of constant amplitude would produce a DC electrical signal at the photodetector. In the embodiment of FIG. 3 the received IR signal is amplitude-modulated with the optical wireless communication signal and so the electrical signal output by the photodetector is effectively the optical wireless communication signal, without any additional down-conversion of the electrical signal output by the photodetector being necessary. Similarly, when the optical wireless communication signal is passed via the branching point and the multiplexer 36 to modulate the drive current of the light source of the transmitter 24 no up-conversion of the optical wireless communication signal is necessary. The configuration and properties of the light source and photodetector are thus such that the optical wireless signal received at a first wavelength or range of wavelengths (e.g. infra-red wavelength(s)) is retransmitted at a second, different wavelength or range of wavelengths (e.g. visible wavelength(s)). Effectively the light source and photodetector and associated electrical circuitries function as wavelength conversion components such that at least part of the received optical wireless signal re-transmitted by the transmitter is re-transmitted at a different wavelength or range of wavelengths than the wavelength or range of wavelengths at which it was received by the receiver. Additional wavelength conversion components may be provided in further embodiments.

The use of the retransmission by the AP 10 of optical wireless communication signals received from one of the STAs 14a to provide an indication to the other STAs 14b, 14c that an optical channel of the STA receiver is busy is now discussed for various different modes of operation of the embodiment of FIG. 3.

Figure 7:
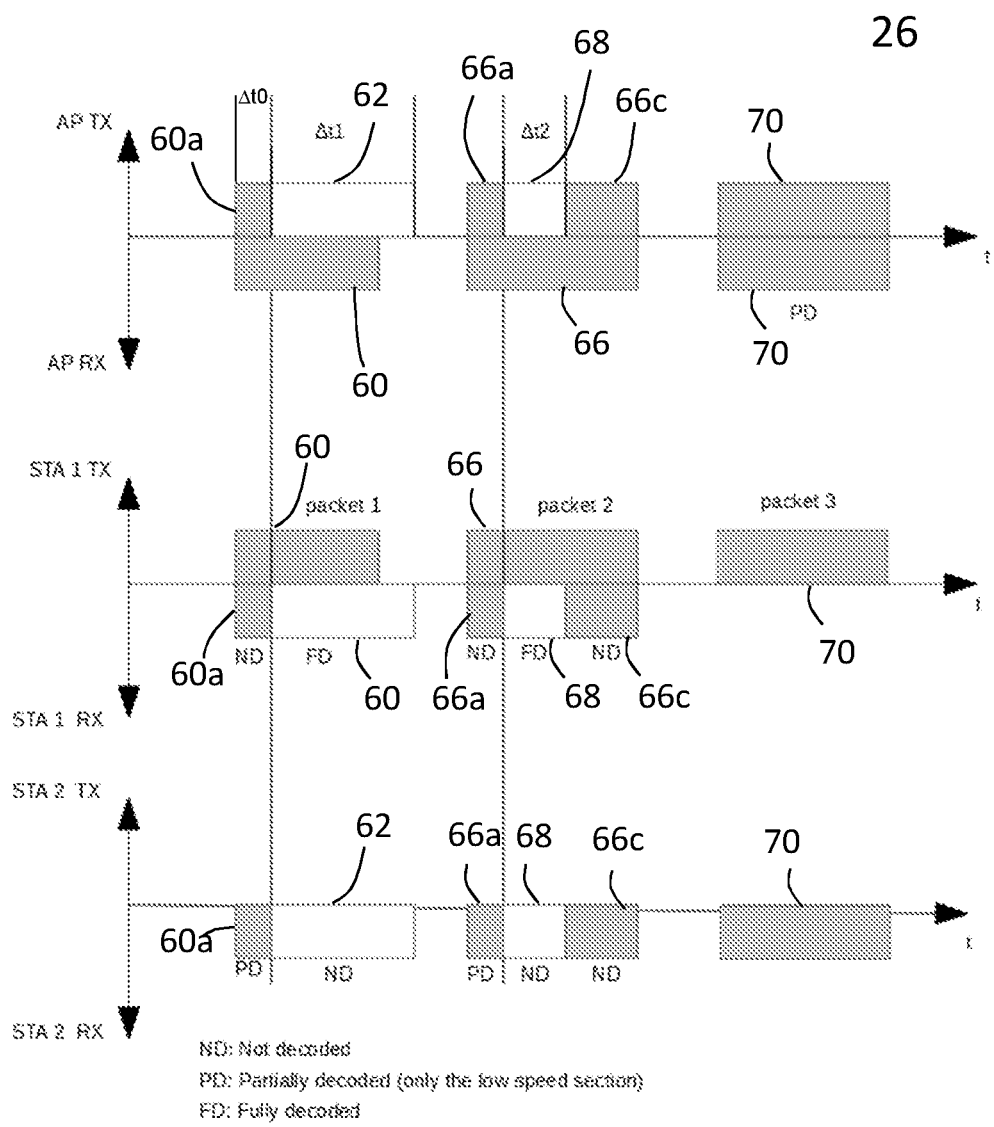
FIG. 7 is a timing diagram that illustrates schematically an optical wireless communication method performed by the embodiment of FIG. 3.

FIG. 7 is a timing diagram that illustrates schematically an optical wireless communication method performed by the embodiment of FIGS. 2 and 3.

The horizontal axes of FIG. 7 represent time. The vertical axis of FIG. 7 is divided into three sections representing, from top to bottom, signals transmitted/received by the access point AP 10, a first of the STAs 14a (referred to as STA1) and a second of the STAs 14b (referred to as STA1).

Signals, in the form of packets, are represented by shaded or clear boxes positioned on the horizontal axis in accordance with time, and on the vertical axis in accordance with the device from to the signal was sent or receiver. The shaded boxes represent packets or parts of packets originated from one of the STAs 14a, 14b, and the clear boxes represent packets or parts of packets that originated from the AP 10.

For each of the three sections, the boxes below the horizontal axis for that section represent signals received at the receiver of the device of that section (e.g. the receiver of AP, STA1 or STA2) and the boxes above the horizontal axis for that section represent signals transmitted by the transmitter of the device of that section (e.g. the transmitter of AP, STA1 or STA2). The letters ND, PD, and FD are used in FIG. 7 to indicate whether a packet is not decoded, partially decoded or fully decoded.

The sending/receiving of three different signals (packet 1, packet 2, packet 3) is represented in FIG. 7.

Figure 9:
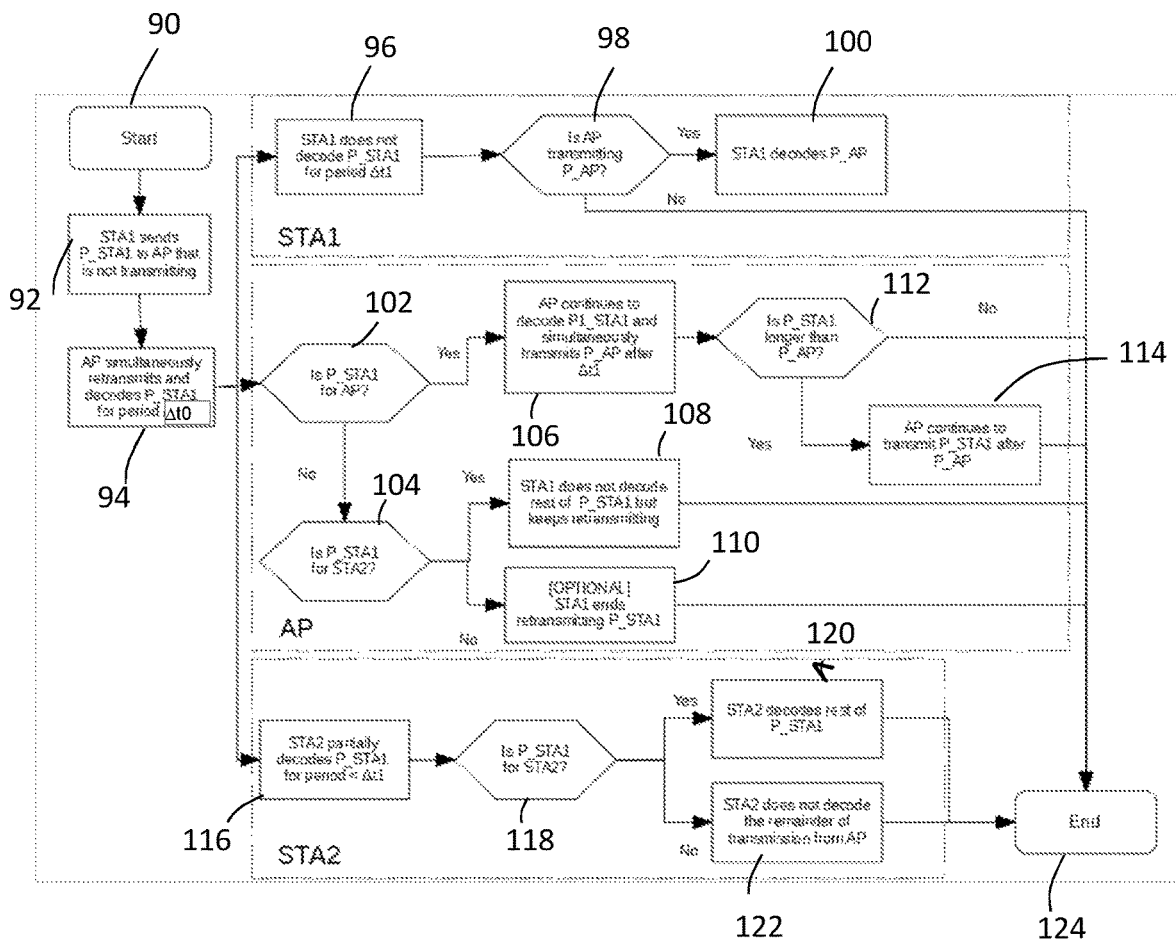
FIG. 9 is a flow chart that represents in overview processes performed by the system of FIG. 3, for example during a contention period.

The method represented by the timing diagrams of FIG. 7 for packet 1, packet 2 and packet 3 is also represented in the flow chart of FIG. 9, which represents in overview processes performed by each of the AP 10, STA1 14a and STA2 14b, for example during a contention period.

The processes illustrated with regard to packet 1 on FIG. 7 represent a case where an uplink packet 60 (packet 1) sent by STA1 14a has a shorter duration than a duration ($\Delta t_1$) of a downlink packet 62 sent in response by AP 10.

STA 1 sends uplink packet 60 (packet 1) (stage 92 of FIG. 9). The AP is not transmitting, therefore the uplink packet 60 (packet 1) is retransmitted by the AP upon receipt (stage 94). STA 1 has disabled its own receiver (stage 96) until the predicted time of the downlink packet 62 because it does not want to receive its own packet 60 or packet fragment. The AP 10 decodes the header section 60a of the uplink packet 60 (packet 1), optionally a low speed section of the packet, and finds that it is the recipient (stage 102). Therefore, it continues decoding packet 1 and also starts to transmit a downlink packet 62 to STA 1 (stage 106). STA 2 also receives the first part 60a of packet 60 (packet 1) and knows after decoding the low speed section (stage 116) that the channel is busy and/or will be busy at least for the duration of the uplink packet 60 (packet 1) (stage 112). In the described embodiment, the header includes information representing the amount of data (e.g. the number of bytes) in the packet and/or different parts of the packet (e.g. header, payload) as well as the modulation and coding scheme (MCS) used in the packet. This information can be used to determine the duration of the packet or the payload.

In this case, the downlink packet 62 continues after the uplink packet 60 (packet 1) has ended. STA 2 14b detects that the channel is still busy and will not attempt to send any packet before the downlink packet 62 to STA 1 has finished and a subsequent frame interspacing period has passed.

Turning to consideration of packet 2 in the timing diagram in FIG. 7, this represents a case where the AP packet (e.g. downlink packet 68) has a duration ($\Delta t_2$) that is shorter than a duration of the uplink packet 66 (packet 2) sent from the station (STA1 14a).

The packet 66 (packet 2) is another uplink packet transmitted by STA1 14a (stage 92) and intended for the AP 10. In this case the downlink packet 68 from the AP 10, sent in response to decoding of the header 66a of the packet 66 by the AP 10 (stage 94) is shorter than the uplink packet 66. After transmission by the AP 10 of the downlink packet 68 has finished, the multiplexer 36 switches back to its default position, and the AP thus resumes retransmitting the uplink packet from STA 1 (stage 114). Thus, in this case, the AP retransmits two portions 66a, 66c of the uplink packet 66 and in the period between the retransmissions of the two portions 66a, 66c of the uplink packet it transmits (stage 106) the downlink packet 68 intended for STA1 14a. STA2 is able to determine that the channel is busy based upon reception and decoding of the header 66a of retransmitted uplink packet 66 (stage 116, 122). In this example, as indicated in FIG. 7, STA2 is able to determine a minimum duration for which the channel will be busy by decoding the header 66a of retransmitted uplink packet 66 and, in this case, STA2 14b does not decode subsequent received data (e.g. 68 and 66c) during that period (stage 122).

Turning to consideration of packet 3 in the timing diagram in FIG. 7, this represents a case where the uplink packet 70 (packet 3) from STA1 14a is intended for STA2 14b and by retransmitting the packet 70 the AP 10 is effectively acting as a relay.

In more detail, as indicated schematically in FIG. 7, the AP 10 finds (stage 102) after decoding the low speed section (the header) that it is not the intended recipient of the packet 70 and does not generate and transmit a downlink signal in response. Instead the AP 10 retransmits (stage 104, 108) the packet 70 (packet 3) and thus forwards it to STA 2 14b. In this case, the communication is thus effectively half duplex, not full duplex. The STAs 14a 14b are using the same uplink channel and downlink channel cascade. The forwarding by AP of the packet 70 without A to D conversion provides a particularly swift and efficient way for STA1 14a and STA2 14b to communicated with each other, even when they are not in line-of-sight of each other.

In FIG. 7, at time periods $\Delta t1$ and $\Delta t2$, the multiplexer 36 directs input from the AP transmitter processing circuitry to the AP luminaire or other AP transmitter. At other times, the multiplexer 36 is switched to retransmit input from the AP receiver. In between packets or frames, frame interspacing periods are respected by the AP 10 and the stations STA1 STA2.

Figure 8:
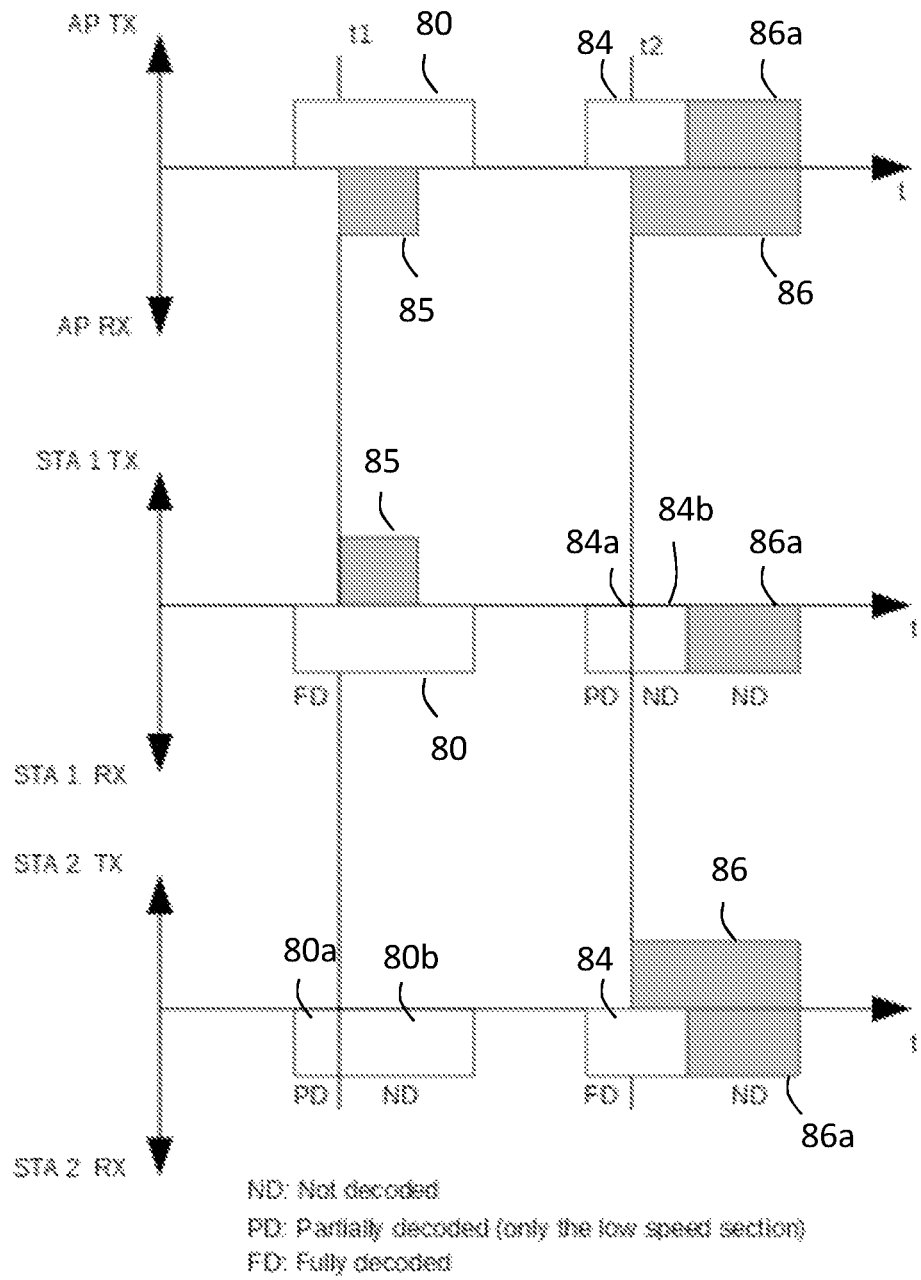
FIG. 8 is a timing diagram that illustrates schematically an optical wireless communication method performed by the embodiment of FIG. 3 during a contention-free period.

FIG. 8 is a timing diagram, in the same format as that of FIG. 7, which illustrates schematically an optical wireless communication method performed by the embodiment of FIG. 3 and used during a contention-free period.

FIG. 8 shows operation of the embodiment of FIG. 3 in a contention free period (CFP), which means the AP 10 polls the STAs 14a, 14b (downlink packets 80, 84).

For the first packet transmission process illustrated in FIG. 8, the uplink packet 85 sent by STA1 14a in response to the downlink packet 80 from the AP 10 is shorter than the downlink packet 80. STA2 14b decodes only the header 80a of the downlink packet 80, determines that the packet is not intended for STA2 14b and then does not decode the remainder of the downlink packet 80b. STA1 decodes header 80a of the downlink packet 80, determines that the packet is intended for STA1 14a, sends the uplink packet 85 in response and continues to decode the remainder of the downlink packet 80b.

For the second packet transmission process illustrated in FIG. 8, the uplink packet 86 is longer than the downlink packet 84. The downlink channel from the AP is kept busy by the retransmission of at least part 86a of the uplink packet in order to prevent any unwanted transition from CFP to CP. STA2 14b decodes the header of the downlink packet, determines that the packet 84 is for STA2 and decodes the remainder 84b of the downlink packet 84. STA2 14b sends uplink packet 86, which is received and partially retransmitted (86a) by the AP 2. STA1 decodes only the header 84a of the downlink packet 84, and determines that the packet 84 is not for STA1 14a, STA1 14a does not decode the remainder of the downlink packet 84 or the retransmitted part of the uplink packet (86a).

The AP 10 is allowed to use a shorter interframe spacing (IFS) than the STAs 14a, 14b. That means the STAs 14a, 14b have to detect an idle channel for a longer time before they are allowed to send. This way the AP 10 has priority and can always stop a contention period (CP) if, for example, some urgent packets have to be sent. If however, the downlink packet stops early, the STAs 14a, 14b would think the channel is idle without the retransmission mechanism.

While certain embodiments described above relate to an AP transceiver apparatus, the transceiver apparatus is integrated into or associated with an optical wireless communication device other than an AP in alternative embodiments, and may be capable of transmitting and receiving optical wireless communication signals to and from a number of other optical wireless communication devices that may or may not be stations. The optical wireless communication transceiver apparatus may be enabled for half-duplex communication, capable of transmitting and receiving optical wireless communication signals along the same wavelength or range of wavelengths, in some embodiments. In various embodiments, the optical wireless communication transceiver apparatus may be associated with an optical wireless communication apparatus that may be mobile or fixed and may be capable of transmitting and receiving optical wireless communication signals to and from a similar optical wireless communication device, such as another mobile device or AP. For example, the system may comprise two or more APs to perform AP to AP optical wireless communication or two or more mobile devices to perform device to device optical wireless communication.

In some situations, full signal retransmission of a received OWC signal by the OWC transceiver apparatus may cause security issues. Therefore, in some embodiments the received OWC signal is converted to noise or a coded signal before retransmission.

In some such embodiments, the transceiver apparatus may comprise an analog scrambler, noise generator or digital encryption system on the second signal path, for example between the branching point 40 and the multiplexer 36 in FIG. 3. Digital encryption may be conducted by processing circuitry, for example between the branching point 40 and the multiplexer 36 in FIG. 3 or within the transmitter-side processing circuitry 30 of FIG. 6. The OWC signal scrambling, noise generation and/or encryption may be selectively activated by the controller 38 to allow the signal to be sent optionally as scrambled signal, noise, coded signal or directly retransmitted signal dependent on the requirements of the system.

Figure 10:
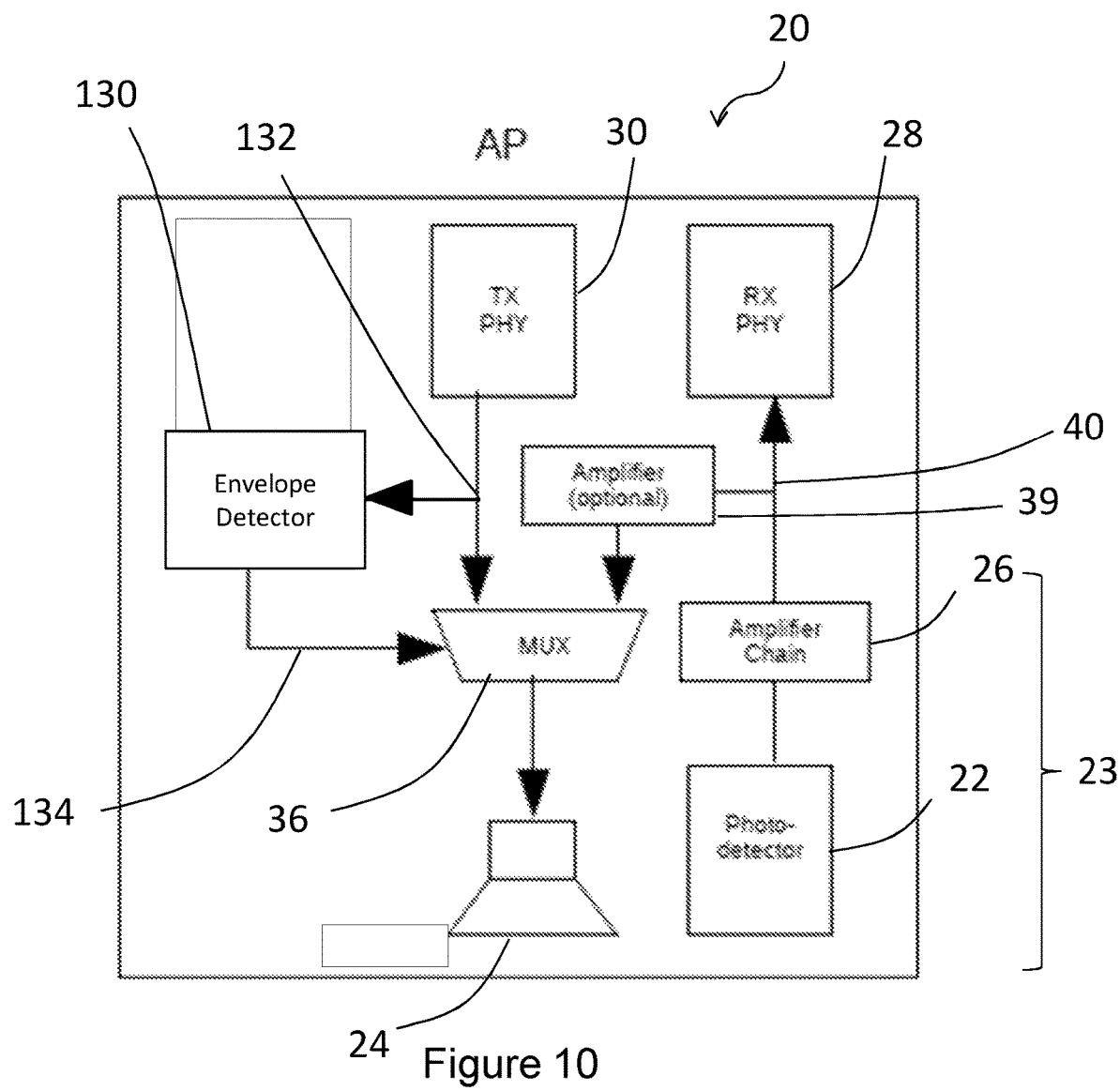
FIG. 10 is a schematic diagram of a transceiver apparatus of an AP according to a further embodiment.

A further alternative embodiment is illustrated in FIG. 10. The embodiment of FIG. 10 is similar to that of FIG. 3, and like reference numerals indicate like components. The embodiment of FIG. 10 includes an envelope detector 130 that has input(s) that are connected to the transmitter-side processing circuitry 30 and an output that is connected to the multiplexer 36.

The transceiver apparatus of FIG. 10 comprises a second branching point 132 on the first signal path. The first signal path is the signal path along which the OWC transceiver apparatus sends an OWC signal to the multiplexer 36 from the OWC transmitter-side processing circuitry 30. The envelope detector is positioned on a third signal path 134 to the multiplexer 36 off the branching point 132 from the transceiver apparatus transmitter-side processing circuitry. The third signal path 134 may be arranged so that in operation an optical wireless communication signal from the transmitter-side processing circuitry 30 is passed both directly to the multiplexer 36 and to the multiplexer 36 via the envelope detector 130. The envelope detector may perform processing on the optical wireless communication signal to be transmitted thereby providing as an output an envelope signal of the modulated optical wireless communication signal, for example as a voltage output. The controller may be configured to control the multiplexer 36 in dependence of the output envelope signal, for example if the output envelope detector signal is above or below a threshold voltage. The switching arrangement may switch the multiplexer 36 to send the modulated optical wireless communication signal from the transmitter-side processing circuitry 30 to the transmitter 24 based on whether the output envelope detector signal is above or below a given voltage threshold. The controller may be configured to control the switching arrangement to switch the multiplexer 36 to send to the transmitter 24 signals from the first signal path from the OWC transmitter-side processing circuitry 30 or from the second signal path, for example from the branching point 40 and/or from the receiver-side circuitry. This processing and control may, in certain embodiments, be performed in the electrical domain without any modification of the packet format or further processing of by the receiver circuitry, such as decoding of the packet.

In examples of current commercially available baseband wireless communication devices, for example commercially available RF baseband wireless communication devices, there does not exist a signal to indicate that the baseband wireless communication device is transmitting. The configuration incorporating an envelope detector as described would provide such a signal.

According to embodiments, the one or more further transceiver apparatus, for example a station (STA) transceiver apparatus, may comprise a controller or other components configured to process a received signal in at least one of the following ways:

1) At least partially decode a received optical wireless communication signal
2) Perform energy detection. The controller may comprise energy detection circuitry for detecting energy level at a predetermined frequency or range of frequencies, optionally wherein the range of frequencies corresponds to a predetermined number of sub-carriers according to the OWC communication protocol used.
3) Detect noise, scrambled signal or digitally encrypted signal as described above.

Based on the results of processing a received signal in at least one of the above ways, the controller may determine whether to cease or continue decoding optical wireless communication signal and/or to transmit or hold off transmitting a further optical wireless communication signal.

In certain embodiments, the controller may be configured to control operation of the OWC transceiver apparatus 20 based on the partial decoding of the signal including an OWC transceiver identifier signal associated with a given further OWC transceiver apparatus, for example a pseudonoise sequence (PN sequence).

A respective PN sequence may be associated with each OWC transceiver apparatus. A PN sequence associated with a given OWC transceiver apparatus may be unique in a given OWC transceiver apparatus service set. The PN sequences may be selected such that the PN sequences have very low-cross correlation to each other.

For example, a PN sequence associated with an AP may be used in downlink transmissions by that AP.

When a STA receives a frame from an AP, it may identify the AP from which the frame was sent using the PN sequence. The STA may comprise a correlator configured to identify the PN sequence by correlating the PN sequence with an expected PN sequence (which is the PN sequence associated with the AP with which the STA is associated).

The PN sequence may be detected by correlation, without decoding the frame comprising the PN sequence.

In certain embodiments, a STA transceiver apparatus may only retransmit or forward on or a received OWC signal, scrambled signal, encrypted signal or noise if the PN sequence received in a frame of a downlink OWC signal frame does not match the PN sequence of an AP or other OWC transceiver apparatus with which the STA is associated or in communication with.

In some embodiments, an AP transceiver apparatus may only retransmit or forward on a received OWC signal, scrambled signal, encrypted signal or noise if a PN sequence in a frame of an uplink OWC signal frame does not match the PN sequence of an AP or other OWC transceiver apparatus with which the AP is associated or in communication with.

This may assist in preventing loops, or multiple signal paths, for example a first path AP 2 to STA and a second path AP 2 to STA to AP1 to STA. While the decoding and comparing PN sequences may, in some cases, introduce latency, it may also increase security.

Figure 6:
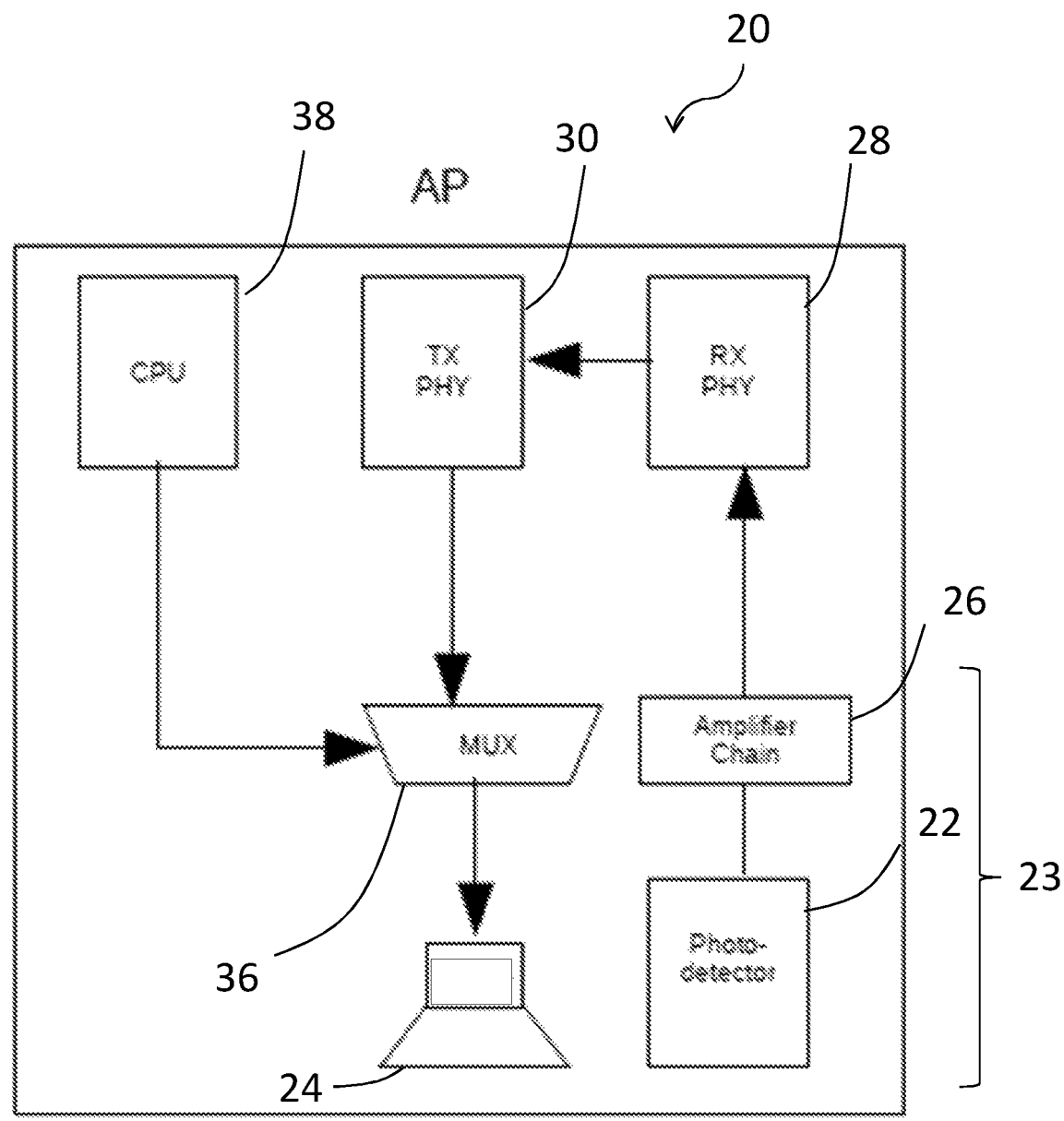
FIG. 6 is a schematic diagram of a transceiver apparatus of an AP according to an alternative embodiment.

In the embodiment of FIG. 6, the received optical wireless communication signal is passed in the form of an electrical signal (e.g, the output from the photodetector 22) from the receiver side along the second signal path (the signal path from the receiver side) to the multiplexer 36. In some alternative embodiments the received optical wireless communication signal is instead passed at least part of the way from the receiver side to the transmitter side in the form of the received light signal, with conversion to an electrical signal occurring at a later stage or using a different component, for example a further photodetector which may be on the transmitter side or between the transmitter and receiver side. In some such embodiments at least some of the received light is converted to electrical signals by the photodetector 22 and the resulting electrical signals passed to the receiver side processing circuitry 28, and at least some of the received light is guided from the receiver side at least part of the way to the transmitter side using at least one electrical component.

For example, in some embodiments, the transceiver apparatus may include at least one optical element that is arranged to direct light representing the optical wireless communication signal from the receiver side along at least part of the signal path from the receiver side. In some such embodiments the at least one optical element may be configured for reflection and divergence of a received optical wireless communication signal in the form of a light signal received at the transceiver 20. The optical element may, for example, be at least one convex mirror.

In some such embodiments the multiplexer may switch between electrical signals or electrical and optical signals (e.g. selecting to send to the transmitter 24 an optical wireless communication signal in the form of electrical signal from the transmitter side processing circuitry 30 or received optical wireless communication signal from the receiver side in the form of either an electrical signal or a light signal). If the received optical wireless communication signal is in the form of a light signal then a photodetector may be provided at any suitable position to convert the light signal to an electrical signal before providing it to the transmitter.

In further alternative embodiments, or variants of the embodiments of FIGS. 6 and 10, the multiplexer arrangement (e.g. multiplexer 36) is not provided and instead the at least one optical element is arranged to reflect and/or direct at least part of the received optical wireless signal to the further devices (e.g. the stations) directly in the form of a light signal without converting the received light signal to an electrical signal. In some such embodiments at least some of the received light is converted to electrical signals by the photodetector 22 and the resulting electrical signals passed to the receiver side processing circuitry 28. The controller in some embodiments then determines whether optical wireless communication signals are being received and controls the transmitter side processing circuitry and/or transmitter to transmit optical wireless communication signals in response to determining that optical wireless communication signals are not being received (and thus also not reflected or guided to the further devices by the optical elements in some embodiments).

Embodiments using optical components may be preferred in some situations where half-duplex communication is provided, for example AP to AP or device-to-device where the transmitters and receivers transmit and receive signals on the same wavelength or range of wavelengths.

A skilled person will appreciate that variations of the described embodiments are possible without departing from the invention. Accordingly, the above description of specific embodiments is provided by way of example only and not for the purposes of limitation. It will be clear to the skilled person that modifications may be made to the embodiments without departing from the scope of the invention.

The invention claimed is:

1. An optical wireless communication system comprising:
a first device comprising a transceiver apparatus; and
a plurality of further devices each comprising respective further transceiver apparatus, wherein the first device is configured to communicate via at least one optical channel with the plurality of further devices, and the transceiver apparatus of the first device comprising:
   a receiver for receiving light (optionally of a first wavelength or range of wavelengths) representing optical wireless communication signals transmitted by the further devices, the receiver comprising at least one photodetector;
   receiver-side processing circuitry for processing optical wireless communication signals received by the receiver to extract data represented by the received optical wireless communication signals;
   a transmitter for transmitting further light (optionally of a second wavelength or range of wavelengths) representing optical wireless communication signals;
   transmitter-side processing circuitry for producing optical wireless communication signals for transmission by the transmitter;
   a multiplexer arrangement that is arranged to receive optical wireless communication signals from a plurality of signal paths and to pass the signals to the transmitter for transmission; and
   a controller for controlling operation of the transceiver apparatus of the first device, wherein
a first of the signal paths to the multiplexer arrangement is from the transmitter-side processing circuitry;
a second of the signal paths to the multiplexer arrangement is from the receiver-side; and
the controller controls operation of the transceiver apparatus so as to pass via the multiplexer arrangement to the transmitter for re-transmission at least part of an optical wireless communication signal received from one of the further devices by the receiver thereby to indicate to the other further devices of the plurality of further devices that an optical channel of the receiver is busy.

2. The system according to claim 1, wherein the transceiver of the first device comprises at least one wavelength conversion component, arranged such that said at least part of the received optical wireless signal re-transmitted by the transmitter is re-transmitted at a different wavelength or range of wavelengths or channel than the wavelength or range of wavelengths or channel at which it was received by the receiver.

3. The system according to claim 1, wherein the passing to the transmitter for re-transmission at least part of the received optical wireless communication signal comprises processing said at least part of the received optical wireless communication signal to produce a processed signal and/or a representation of said at least part of the received optical wireless communication signal, and the re-transmission comprises transmitting by the transmitter said processed signal and/or representation.

4. The system according to claim 1, wherein the receiver-side processing circuitry comprises a chain of receiver-side processing components that perform a sequence of operations on received optical wireless communication signals, and the second of the signal paths to the multiplexer arrangement is from a branching point on the receiver-side before a subsequent at least one of said receiver-side components.

5. The system according to claim 4, wherein the receiver-side processing circuitry is configured such that a received optical wireless communication signal is split at the branching point such that the received optical wireless communication signal is both sent along the second of the signal paths to the multiplexer arrangement, and sent to the subsequent at least one of said receiver-side components.

6. The system according to claim 4, wherein the branching point is arranged so that at least part of the optical wireless communication signal is at least partially decoded or otherwise processed, optionally by the receiver side processing circuitry, and optionally is simultaneously retransmitted by the transmitter of the first device.

7. The system according to claim 1, wherein the controller is configured to control operation of at least one of the multiplexer arrangement, the splitting of the received optical wireless communication signal at the or a branching point, and/or the transmitter of the first device.

8. The system according to claim 7, wherein said control is in dependence on an outcome of said decoding or other processing of the received optical wireless communication signal.

9. The system according to claim 8, wherein said decoding or other processing of the received optical wireless communication signal comprises determining an identifier that identifies the device or group of devices from which the optical wireless signal was received and the controlling of at least one of the multiplexer, the splitting of the received optical wireless communication signal at the branching point, or the transmitter is performed in dependence on said identifier.

10. The system according to claim 1, wherein the controller is configured to perform at least one action in response to the outcome of the or an at least partial decoding or other processing of the received optical wireless communication signal, said at least one action comprising at least one of:
  a) continuing to retransmit by the transmitter of the first device said received optical wireless communication signal;
  b) cease retransmitting by the transmitter of the first device said received optical wireless communication signal; or
  c) transmit by the transmitter of the first device an optical wireless communication signal of the first device sent to the multiplexer arrangement via the first signal path from the transmitter-side processing circuitry.

11. The system according to claim 10, wherein the controller is configured to control operation of the transceiver apparatus of the first device so that if said at least partial decoding or other processing of the received optical wireless communication signal indicates that the optical wireless communication signal is intended for the first device, then cease retransmitting by the transmitter of the first device of said received optical wireless communication signal, transmit by the transmitter of the first device said optical wireless communication signal of the first device and if the duration of the optical wireless communication signal of the first device is less than the duration of the received optical wireless communication signal then resume retransmission of the received optical wireless communication signal after completion of transmission of the optical wireless communication signal of the first device.

12. The system according to claim 1, wherein the received optical wireless communication signal is an uplink signal and at least one of the optical wireless communication signals produced by the transmitter-side processing circuitry comprises a downlink signal sent in response to the uplink signal, wherein the uplink signal and downlink signal comprise or form part of an exchange of signals between a further device of the plurality of further devices and the first device that establishes or forms part of a channel busy period during which an optical wireless communication channel from the first device is reserved for said further device and is excluded for use by other of the further devices.

13. The system according to claim 1, further comprising an envelope detector arranged to receive optical wireless communication signals from the transmitter-side processing circuitry, wherein operation of the multiplexer arrangement and/or the transmitter is dependent on an output of the envelope detector.

14. The system according to claim 13, wherein the multiplexer arrangement and/or transmitter is configured so as to switch between re-transmitting the received optical wireless communication signal and transmitting optical wireless communication signal(s) from the transmitter-side processing circuitry in dependence on an output of the envelope detector.

15. The system according to claim 1, wherein the second of the signal paths to the multiplexer arrangement is arranged such that optical wireless communication signals received by the receiver of the first device are passed to the multiplexer arrangement in analogue form and/or without analogue to digital conversion.

16. The system according to claim 1, wherein the second of the signal paths includes at least one optical component that is arranged to direct light representing the optical wireless communication signal from the receiver side along said second signal path.

17. The system according to claim 16, further comprising a further receiver on said second signal path configured to convert said directed light to a corresponding electrical signal, optionally for providing to the multiplexer arrangement.

18. The system according to claim 1, further comprising at least one optical component that is configured to reflect or otherwise direct in a desired direction at least some of the received light representing optical wireless communication signals, wherein the at least one optical component is configured to reflect or otherwise direct said at least some of the received light representing optical wireless communication signals towards at least one, optionally each, of the further devices.

19. The system according to claim 18, wherein the at least one optical component comprises a mirror, optionally a convex mirror.

20. The system according to claim 1, wherein the transceiver apparatus of the first device is configured to re-transmit received optical wireless communication signals, in whole or part, only if the transmitter is not busy with transmission of optical wireless communication signals from the transmitter-side processing circuitry.

21. The system according to claim 1, wherein the controller is configured to control operation of the transceiver apparatus of the first device such that at least one of l) or m):
  l) the transmitter of the first device retransmits a selected portion of the received wireless communication signal from the second signal path and in response to completion of the retransmission of said selected portion the transmitter of the first device transmits, or is made available to transmit, a signal from the first signal path;

m) the transmitter of the first device retransmits a selected portion of the received wireless communication signal from the second signal path for a period of time, and in response to completion of said period of time the transmitter of the first device transmits, or is made available to transmit, a signal from the first signal path.

22. The system according to claim 1, wherein the further devices are configured such that the further device that transmits said optical wireless transmission signal that is retransmitted by the transmitter of the first device disables at least one component of its receiver or receiver side processing circuitry during at least part of the period during which the optical wireless transmission signal is retransmitted by the first device.

23. The system according to claim 1, wherein the plurality of further devices are configured such that each of the other further devices of the plurality of further devices disables at least one component of its transmitter or transmitter side processing circuitry, or defers transmission, during at least part of the period during which the channel is busy with transmission between the first device and the further device of the plurality of further devices whose optical wireless communication signal is received by the first device.

24. The system according to claim 23, wherein each of the plurality of further devices are configured to determine whether to disable said at least one component or defer transmission based on a processing of at least a portion of an optical wireless communication signal received from the first device from the re-transmission process.

25. The system according to claim 24, wherein the processing comprises an energy detection process and/or detection of noise, detection of a scrambled signal or at least partial decryption of an encrypted signal.

26. The system according to claim 1, wherein each of the other of the plurality of further devices determine a duration of the channel busy period based on a decoding of at least a portion, optionally a header, of the retransmitted optical wireless communication signal and/or said transmitted optical wireless communication signal of the first device.

27. The system according to claim 1, wherein each of said other of the plurality of further devices is configured to receive and decode at least a part of said retransmitted optical wireless communication signal and to selectively enable or disable at least one component of its transmitter or transmitter side processing circuitry, or defer or start transmissions, or continue or cease decoding or other processing, depending on the retransmitted optical wireless communication signal.

28. The system according to claim 1, wherein the optical wireless communication system comprises a full duplex communication system or a half duplex communication system.

29. The system according to claim 28, wherein the optical wireless communication system is configured to operate in a half duplex mode in which the transceiver apparatus is capable of transmitting and receiving optical wireless communication signals using the same wavelength or range of wavelengths.

30. A system according to claim 1, wherein at least one amplifier is included on the second signal path.

31. A system according to claim 1, wherein the receiver side processing circuitry comprises a physical layer stage.

32. A transceiver apparatus of a first device configured to communicate via at least one optical channel with a plurality of further devices, the transceiver apparatus comprising:

a receiver for receiving light (optionally of a first wavelength or range of wavelengths) and representing optical wireless communication signals transmitted by the plurality of further devices, the receiver comprising at least one photodetector;

receiver-side processing circuitry for processing optical wireless communication signals received by the receiver to extract data represented by the received optical wireless communication signals;

a transmitter for transmitting light (optionally of a second wavelength or range of wavelengths) and representing optical wireless communication signals;

transmitter-side processing circuitry for producing optical wireless communication signals for transmission by the transmitter;

a multiplexer arrangement that is arranged to receive optical wireless communication signals from a plurality of signal paths and to pass the signals to the transmitter for transmission; and a controller for controlling operation of the AP transceiver apparatus, wherein a first of the signal paths to the multiplexer arrangement is from the transmitter-side processing circuitry;

a second of the signal paths to the multiplexer arrangement is from the receiver-side; and the controller controls operation of the transceiver apparatus so as to pass via the multiplexer arrangement to the transmitter for re-transmission at least part of an optical wireless communication signal received from one of the plurality of further devices by the receiver thereby to indicate to the other of the plurality of further devices that an optical channel of the receiver is busy.

33. A transceiver apparatus of a further device configured to communicate via at least one optical channel with a first device or at least one other further device, the transceiver apparatus of said further device comprising:

a receiver for receiving light (optionally of a first wavelength or range of wavelengths) and representing optical wireless communication signals, the receiver comprising at least one photodetector;

receiver-side processing circuitry for processing optical wireless communication signals received by the receiver to extract data represented by the received optical wireless communication signals;

a transmitter for transmitting light (optionally of a second wavelength or range of wavelengths) and representing optical wireless communication signals;

transmitter-side processing circuitry for producing optical wireless communication signals for transmission by the transmitter; and a controller for controlling operation of the transceiver apparatus, wherein the controller is configured to partially decode a received optical wireless communication signal and to determine whether to cease or continue decoding optical wireless communication signal and/or to transmit or hold off transmitting a further optical wireless communication signal depending on the outcome of the partial decoding.

34. A method of operating an optical wireless communication system, the system comprising:

a first device comprising a transceiver apparatus; and a plurality of further devices each comprising respective further transceiver apparatus, wherein the first device is configured to communicate via at least one optical channel with a plurality of further devices, and the transceiver apparatus of the first device comprising:
- a receiver for receiving light (optionally of a first wavelength or range of wavelengths) representing optical wireless communication signals transmitted by the further devices, the receiver comprising at least one photodetector;
- receiver-side processing circuitry for processing optical wireless communication signals received by the receiver to extract data represented by the received optical wireless communication signals;
- a transmitter for transmitting light of a second wavelength or range of wavelengths and representing optical wireless communication signals; and
- transmitter-side processing circuitry for producing optical wireless communication signals for transmission by the transmitter, the method comprising:
receiving an optical wireless communication signal by the receiver of the first device, and determining whether to retransmit by the transmitter of the first device said optical wireless communication signal, in whole or part, or whether to transmit by the transmitter of the first device a further optical wireless communication signal, in dependence on data encoded by at least part of said optical wireless communication signal; and
retransmitting by the transmitter of the first device a part of said optical wireless communication signal, wherein the determining comprises determining in dependence on said encoded data whether to retransmit a further part of said received optical wireless communication signal.

* * * * *